United States Patent
Varaldi et al.

(10) Patent No.: US 12,066,090 B2
(45) Date of Patent: Aug. 20, 2024

(54) METHOD FOR ESTIMATING WEAR OF A POLYMER DRIVE BELT OF A CONTINUOUSLY VARIABLE TRANSMISSION

(71) Applicant: BOMBARDIER RECREATIONAL PRODUCTS INC., Valcourt (CA)

(72) Inventors: Vincent Varaldi, Eastman (CA); Xavier-Pierre Aitcin, St-Hyacinthe (CA); Thibault Guillaud-Rollin, Sherbrooke (CA); Benoit Simard, Bromont (CA); Philippe Laprise, Drummondville (CA); Mathieu Leblond, Drummondville (CA)

(73) Assignee: BOMBARDIER RECREATIONAL PRODUCTS INC., Valcourt (CA)

(*) Notice: Subject to any disclaimer, the term of this patent is extended or adjusted under 35 U.S.C. 154(b) by 745 days.

(21) Appl. No.: 17/273,213

(22) PCT Filed: Sep. 6, 2019

(86) PCT No.: PCT/IB2019/057543
§ 371 (c)(1),
(2) Date: Mar. 3, 2021

(87) PCT Pub. No.: WO2020/049525
PCT Pub. Date: Mar. 12, 2020

(65) Prior Publication Data
US 2021/0356031 A1    Nov. 18, 2021

Related U.S. Application Data
(60) Provisional application No. 62/728,710, filed on Sep. 7, 2018.

(51) Int. Cl.
*F16H 57/01* (2012.01)
*F16H 61/12* (2010.01)
(Continued)

(52) U.S. Cl.
CPC ............. *F16H 57/01* (2013.01); *F16H 61/12* (2013.01); *F16H 61/662* (2013.01); *G01M 13/023* (2013.01)

(58) Field of Classification Search
CPC ........ F16H 61/662; F16H 61/12; F16H 57/01; G01M 13/023; F16G 5/04
See application file for complete search history.

(56) References Cited

U.S. PATENT DOCUMENTS
| | | |
|---|---|---|
| 4,731,044 A | 3/1988 | Mott |
| 6,188,944 B1 | 2/2001 | Kolmanovsky et al. |

(Continued)

FOREIGN PATENT DOCUMENTS
| | | |
|---|---|---|
| CN | 101922548 A | 12/2010 |
| CN | 102221460 A | 10/2011 |

(Continued)

OTHER PUBLICATIONS
Extended European Search Report of corresponding European application No. 19858593.7, Issued on Mar. 17, 2022.
(Continued)

Primary Examiner — James R Bidwell
(74) Attorney, Agent, or Firm — BCF LLP

(57) ABSTRACT

A method for estimating wear of a polymer drive belt of a continuously variable transmission (CVT) provided in a vehicle is disclosed. The method comprises: determining a first belt wear-affecting factor based on at least one first operating parameter of the vehicle; determining a second belt wear-affecting factor based on at least one second operating parameter of the vehicle; applying the first and second wear-affecting factors to a belt wear-representative parameter to obtain an adjusted belt wear-representative parameter; and adjusting a total belt wear-representative parameter based on the adjusted belt wear-representative (Continued)

parameter to obtain an updated total belt wear-representative parameter. A vehicle having an electronic control unit configured to perform the method is also disclosed.

21 Claims, 17 Drawing Sheets

(51) Int. Cl.
*F16H 61/662* (2006.01)
*G01M 13/023* (2019.01)

(56) References Cited

U.S. PATENT DOCUMENTS

| | | |
|---|---|---|
| 6,427,109 B1 | 7/2002 | Doering et al. |
| 6,547,692 B1 | 4/2003 | Ries-Mueller et al. |
| 7,390,283 B2 | 6/2008 | Rinderknecht |
| 7,794,344 B2 | 9/2010 | Ishioka et al. |
| 8,312,987 B2 | 11/2012 | Lynn et al. |
| 2007/0142141 A1 | 6/2007 | Vornehm |
| 2009/0303065 A1 | 12/2009 | Lipowski |
| 2014/0243125 A1 | 8/2014 | Koga et al. |
| 2018/0174374 A1* | 6/2018 | Choi .................. F16H 57/01 |
| 2018/0211454 A1 | 7/2018 | Carlson et al. |

FOREIGN PATENT DOCUMENTS

| | | | |
|---|---|---|---|
| CN | 105650272 B | 8/2017 | |
| CN | 111836980 | * 10/2020 | ............ F16H 61/66 |
| JP | 2004340234 A | 12/2004 | |

OTHER PUBLICATIONS

Search Report issued in corresponding application No. 2019800606012, Issued on Feb. 28, 2022.
International Search Report of PCT/IB2019/057543; Search completed on Mar. 24, 2020; Lee Young.

* cited by examiner

METHOD FOR ESTIMATING WEAR OF A POLYMER DRIVE BELT OF A CONTINUOUSLY VARIABLE TRANSMISSION

CROSS-REFERENCE

The present application claims priority to U.S. Provisional Patent Application No. 62/728,710, filed Sep. 7, 2018, the entirety of which is incorporated herein by reference.

FIELD OF TECHNOLOGY

The present technology relates to methods for estimating wear of a polymer drive belt of a continuously variable transmission.

BACKGROUND

Many vehicles use a continuously variable transmission (CVT) to transmit power from the engine to the wheels. A CVT includes a drive pulley, a driven pulley, and drive belt around the pulleys. The engine drives the drive pulley, which drives the belt, which drives the driven pulley, which then drives the wheels, typically via other mechanical components provided between the driven pulley and the wheels.

Each of the pulleys has a movable sheave and a fixed sheave. As the movable sheave of a given pulley moves closer to the fixed sheave, the drive belt is pushed to turn about a greater radius about the pulley, and the pulley is said to have a greater effective diameter. Similarly, as the movable sheave moves away from the fixed sheave, the drive belt moves to turn about a smaller radius about the corresponding pulley, and the pulley is said to have a smaller effective diameter. During operation, as the speed of the engine increases, the effective diameter of the drive pulley increases and the effective diameter of the driven pulley decreases. Similarly, as the speed of the engine decreases, the effective diameter of the drive pulley decreases and the effective diameter of the driven pulley increases.

When the engine is under a heavy load, such as during acceleration, travelling uphill or when towing a load, the effective diameter of the drive pulley decreases and the effective diameter of the driven pulley increases Many drive belts of CVTs are made of polymer which wear due to friction, tension and deformation. During operation of the CVT, a given portion of the drive belt will experience tension, compression and bending as the drive belt rotates around the pulleys. As the drive belt rubs against the sheaves as their effective diameters change, the belt can slip relative to the pulleys and the drive belt is squeezed and deforms between the sheaves of the pulleys. Also, when the belt turns about the pulleys, the material of the belt gets compressed on the inside and stretches on the outside, and this effect increases as the effective diameter of the pulleys decreases. All of this leads to wear of the drive belt. For this reason, vehicle manufacturers typically recommend to change the drive belt after a certain number of kilometers travelled by the vehicle, a certain number of hours of operation of the vehicle or a combination thereof. In some vehicles, a visual indication that maintenance is recommended is provided on an instrument panel to inform the driver that the drive belt should be inspected or may need to be changed.

However, setting the maintenance schedule based on number of kilometers traveled and/or number of hours of operations does not take into account the vehicle's operating conditions, such as the way in which the driver operates the vehicle and/or other environmental conditions in which the vehicle operates. For example, a driver who accelerates and/or decelerates quickly and often will cause more wear to the drive belt than a driver that operates the vehicle at constant speed for long periods of time. Also for example, a polymer belt will wear faster in a hot environment than in a cold environment.

Therefore, there is a desire for a method for estimating wear of the polymer drive belt of a CVT that takes into account the vehicle's operating conditions.

SUMMARY

It is an object of the present technology to ameliorate at least some of the inconveniences present in the prior art.

The present technology provides a method for estimating wear of a polymer drive belt of a CVT which, in some embodiments, uses a belt load-representative parameter, a belt speed-representative parameter and/or a belt temperature representative parameter to determine one or more factors. The one or more factors are then used to modify a parameter used to determine when the drive belt may need to be replaced. In one example where the parameter used to estimate when the drive belt may need to be replaced is distance travelled by the vehicle, if the vehicle travels 100 km, but with a lot of acceleration and deceleration cycles and in a very hot environment such as the desert for example, the one or more factors could modify this 100 km to actually count as 120 km towards the maintenance limit to account for the extra wear on the belt resulting from such an operation. A similar modification could be done where the parameter is time. In another example, the parameter is a counter based on the one or more factors.

According to one aspect of the present technology, there is provided a method for estimating wear of a polymer drive belt of a continuously variable transmission (CVT) provided in a vehicle. The method comprises: determining a first belt wear-affecting factor based on at least one first operating parameter of the vehicle; determining a second belt wear-affecting factor based on at least one second operating parameter of the vehicle; applying the first and second wear-affecting factors to a belt wear-representative parameter to obtain an adjusted belt wear-representative parameter; and adjusting a total belt wear-representative parameter based on the adjusted belt wear-representative parameter to obtain an updated total belt wear-representative parameter.

In some embodiments of the present technology, the at least one first operating parameter includes a belt load-representative parameter.

In some embodiments of the present technology, the at least one first operating parameter further includes a belt speed-representative parameter.

In some embodiments of the present technology, the at least one first operating parameter of the vehicle is at least one of: vehicle speed; engine speed; drive belt speed; rotational speed of a driven pulley of the CVT; rotational speed of a ground engaging member of the vehicle; rotational speed of a rotating element operatively connecting the driven pulley to the ground engaging member; engine load; engine torque; CVT ratio; air charge; or relative air charge.

In some embodiments of the present technology, the belt speed-representative parameter is one of: vehicle speed; engine speed; drive belt speed; rotational speed of a driven pulley of the CVT; rotational speed of a ground engaging member of the vehicle; or rotational speed of a rotating element operatively connecting the driven pulley to the ground engaging member. The belt load-representative parameter is one of: engine load; engine torque; CVT ratio; air charge; or relative air charge.

In some embodiments of the present technology, the belt speed-representative parameter is vehicle speed and the belt load-representative parameter is relative air charge.

In some embodiments of the present technology, determining the first belt wear-affecting factor comprises: inputting the belt speed-representative parameter and the belt load-representative parameters in one of a first map, a first table or a first equation; and obtaining the first belt wear-affecting factor from the one of the first map, the first table or the first equation.

In some embodiments of the present technology, the at least one first operating parameter of the vehicle is engine speed.

In some embodiments of the present technology, determining the first belt wear-affecting factor comprises: inputting the at least one first operating parameter of the vehicle in one of a first map, a first table or a first equation; and obtaining the first belt wear-affecting factor from the one of the first map, the first table or the first equation.

In some embodiments of the present technology, the at least one first operating parameter of the vehicle further includes a substitute operating parameter of the vehicle; and the first belt wear-affecting factor is determined using the substitute operating parameter when at least one of the belt load-representative parameter and the belt speed-representative parameter is unavailable or faulty.

In some embodiments of the present technology, the substitute operating parameter of the vehicle is different from the belt load-representative parameter and the belt speed-representative parameter.

In some embodiments of the present technology, the belt load-representative and belt speed-representative parameters are relative air charge and vehicle speed; and the substitute operating parameter of the vehicle is engine speed.

In some embodiments of the present technology, the first belt wear-affecting factor is a belt load factor associated with a load applied on the drive belt.

In some embodiments of the present technology, the at least one second operating parameter is a belt temperature-representative parameter.

In some embodiments of the present technology, the at least one second operating parameter of the vehicle is at least one of: ambient air temperature; CVT air intake air temperature, the CVT air intake air temperature being a temperature of air in a CVT air intake assembly supplying air in a CVT housing of the CVT; CVT housing air temperature, the CVT housing air temperature being a temperature of air in the CVT housing; or drive belt temperature.

In some embodiments of the present technology, the at least one second operating parameter of the vehicle is ambient air temperature.

In some embodiments of the present technology, determining the second belt wear-affecting factor comprises: inputting the at least one second operating parameter of the vehicle in one of a second map, a second table or a second equation; and obtaining the second belt wear-affecting factor from the one of the second map, the second table or the second equation.

In some embodiments of the present technology, the second belt wear-affecting factor is a belt temperature factor associated with a temperature of the drive belt.

In some embodiments of the present technology, the belt wear-representative parameter is one of: vehicle speed; vehicle travel distance; drive belt use time; drive belt rotations; engine rotations; or drive belt wear units.

In some embodiments of the present technology, applying the first and second wear-affecting factors to the belt wear-representative parameter to obtain the adjusted belt wear-representative parameter comprises: multiplying the belt wear-representative parameter by the first wear-affecting factor and by the second wear-affecting factor to obtain the adjusted belt wear-representative parameter.

In some embodiments of the present technology, applying the first and second wear-affecting factors to the belt wear-representative parameter to obtain the adjusted belt wear-representative parameter comprises: multiplying the belt wear-representative parameter by the first wear-affecting factor to obtain a first intermediate adjusted belt wear-representative parameter; multiplying the belt wear-representative parameter by the second wear-affecting factor to obtain a second intermediate adjusted belt wear-representative parameter; and adding the first and second intermediate adjusted belt wear-representative parameter to obtain the adjusted belt wear-representative parameter.

In some embodiments of the present technology, assigning a first weight to the belt wear-representative parameter prior to multiplying the belt wear-representative parameter by the first wear-affecting factor; and assigning a second weight to the belt wear-representative parameter prior to multiplying the belt wear-representative parameter by the second wear-affecting factor.

In some embodiments of the present technology, adjusting the total belt wear-representative parameter based on the adjusted belt wear-representative parameter to obtain the updated total belt wear-representative parameter comprises: adding the adjusted belt wear-representative to the total belt wear-representative parameter.

In some embodiments of the present technology, comparing the updated total belt wear-representative parameter to a threshold belt wear; and providing an indication of a need for transmission maintenance on the vehicle when the updated total belt wear-representative parameter is greater than or equal to the threshold belt wear.

In some embodiments of the present technology, comparing the updated total belt wear-representative parameter to a threshold belt wear; and reducing engine performance when the updated total belt wear-representative parameter is greater than or equal to the threshold belt wear.

In some embodiments of the present technology, adjusting the total belt wear-representative parameter based on the adjusted belt wear-representative parameter to obtain the updated total belt wear-representative parameter comprises: subtracting the adjusted belt wear-representative from the total belt wear-representative parameter.

In some embodiments of the present technology, comparing the updated total belt wear-representative parameter to a threshold belt wear; and providing an indication of a need for transmission maintenance on the vehicle when the updated total belt wear-representative parameter is less than or equal to the threshold belt wear.

In some embodiments of the present technology, the adjusted belt wear-representative parameter corresponds to a first belt wear-representative parameter; and the total belt wear-representative parameter corresponds to a second belt wear-representative parameter that is different from the first belt wear-representative parameter; and adjusting the total belt wear-representative parameter based on the adjusted belt wear-representative parameter comprises: converting the adjusted belt wear-representative parameter to correspond to correspond to the second belt wear-representative parameter to obtain a converted adjusted belt wear-representative parameter; and adjusting the total belt wear-representative parameter based on the converted adjusted belt wear-representative parameter.

In some embodiments of the present technology, the adjusted belt wear-representative parameter corresponds to vehicle speed; and the total belt wear-representative parameter corresponds to vehicle travel distance.

In some embodiments of the present technology, the one of the first map, the first table or the first equation has a normal wear region and an extra wear region; when the first belt wear-affecting factor is obtained from the normal wear region, applying the first belt wear-affecting factor to the belt wear-representative parameter does not increase a value of the belt wear-representative parameter; and when the first belt wear-affecting factor is obtained from the extra wear region, applying the first belt wear-affecting factor to the belt wear-representative parameter increases the value of the belt wear-representative parameter.

In some embodiments of the present technology, the one of the second map, the second table or the second equation has a normal wear region and an extra wear region; when the second belt wear-affecting factor is obtained from the normal wear region, applying the second belt wear-affecting factor to the belt wear-representative parameter does not increase a value of the belt wear-representative parameter; and when the second belt wear-affecting factor is obtained from the extra wear region, applying the second belt wear-affecting factor to the belt wear-representative parameter increases the value of the belt wear-representative parameter.

In some embodiments of the present technology, adjusting the total belt wear-representative parameter based on the adjusted belt wear-representative parameter to obtain the updated total belt wear-representative parameter comprises: adding the adjusted belt wear-representative parameter to the belt wear-representative parameter to obtain a sum; and adjusting the total belt wear-representative parameter based on the sum to obtain the updated total belt wear-representative parameter.

In some embodiments of the present technology, the method further comprises resetting the total belt wear-representative parameter upon receiving a signal indicative that the drive belt has been replaced by another drive belt.

In some embodiments of the present technology, the method further comprises repeating the steps of the method with a magnitude of the total belt wear-representative parameter corresponding being replaced by a magnitude of the updated total belt wear-representative parameter.

According to another aspect of the present technology, there is provided a vehicle having: a frame; a seat connected to the frame; an engine connected to the frame; at least one ground engaging member operatively connected to the engine; and a continuously variable transmission (CVT) operatively connecting the engine to the at least one ground engaging member. The CVT has: a drive pulley operatively connected to the engine; a driven pulley operatively connected to the at least one ground engaging member; and a drive belt wrapped around the drive pulley and the driven pulley. The drive belt is made of polymer. The vehicle also has a plurality of sensors; and an electronic control unit (ECU) communicating with the plurality of sensors. The ECU has: a non-transitory computer-readable medium; and a processor configured to perform at least one embodiment of the above method.

In some embodiments of the present technology, the plurality of sensors include at least two different sensors selected from: a vehicle speed sensor; a wheel speed sensor; an engine speed sensor; an intake air temperature sensor; an intake air pressure sensor; an ambient air temperature sensor; a belt temperature sensor; a CVT housing air temperature sensor; a CVT housing pressure sensor; an atmospheric pressure sensor; and a throttle position sensor.

According to another aspect of the present technology, there is provided a method for estimating wear of a polymer drive belt of a continuously variable transmission (CVT) provided in a vehicle. The method comprises: sensing a belt load-representative parameter of the vehicle; sensing a belt temperature-representative parameter of the vehicle; determining an estimated change in belt wear based on the belt load-representative parameter and the belt temperature-representative parameter; adjusting an estimated total belt wear based on the estimated change in belt wear to obtain an updated estimated total belt wear; comparing the updated estimated total belt wear to a threshold belt wear; and providing an indication of a need for maintenance on the vehicle when the updated estimated total belt wear is greater than or equal to the threshold belt wear.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

The present technology will be described with respect to a three-wheeled straddle-type vehicle 10. However, it is contemplated that the present technology could be applied to other vehicles equipped with a continuously variable transmission (CVT), some example of which will be briefly described further below.

Figure 1:
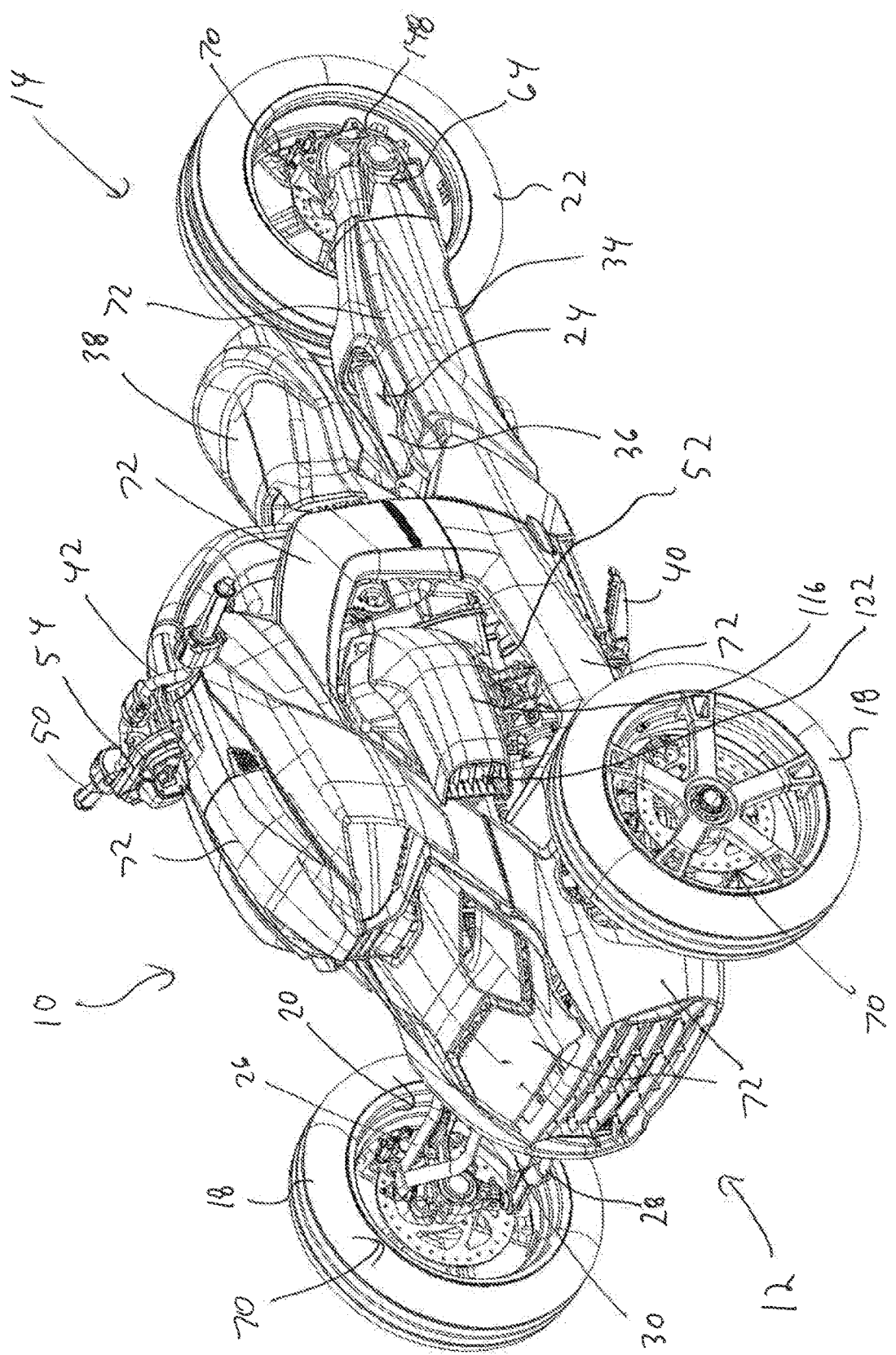
FIG. 1 is a perspective view taken from a front, left side of a three-wheeled vehicle.
Figure 2:
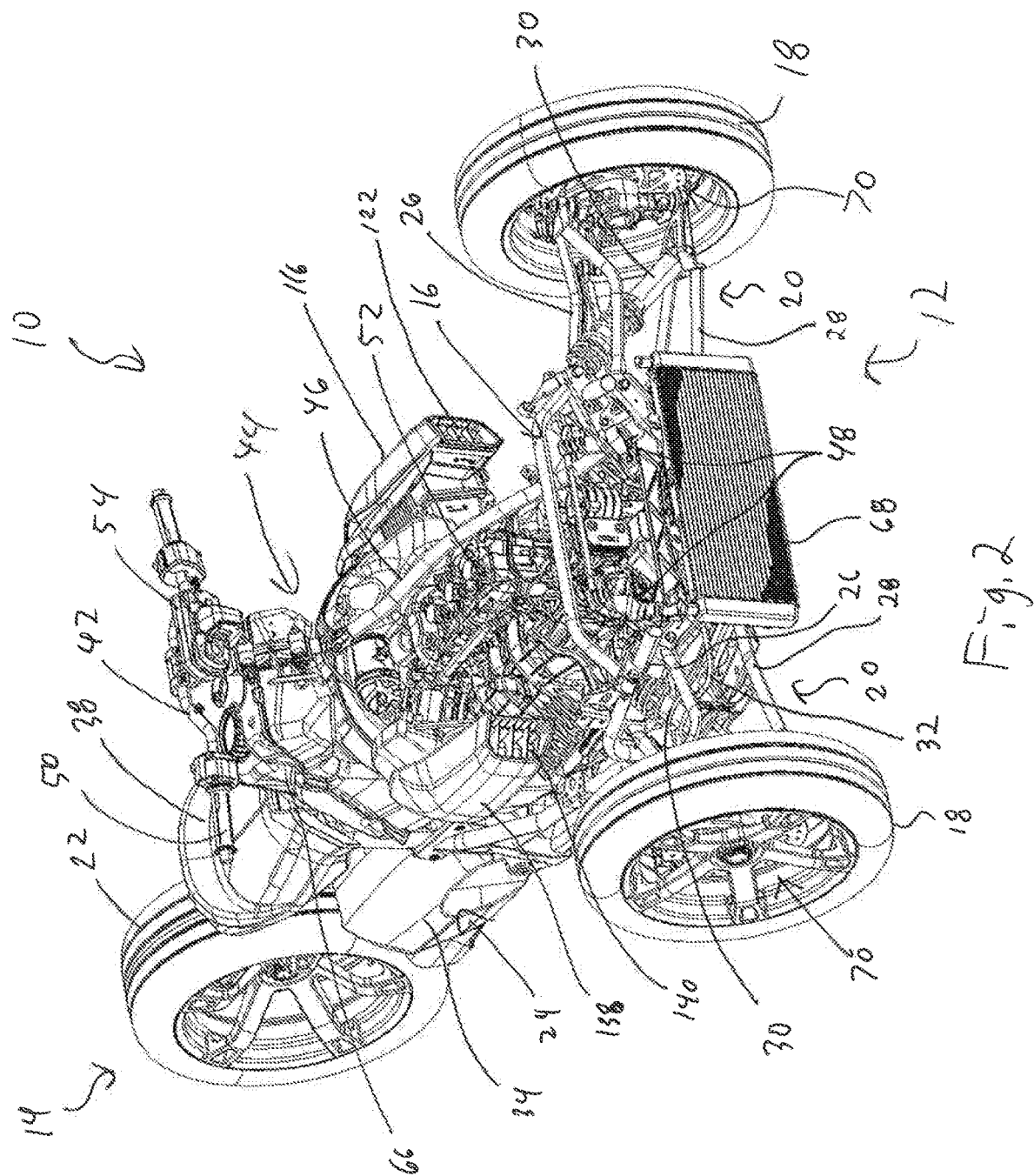
FIG. 2 is a perspective view taken from a front, right side of the vehicle of FIG. 1 with some fairings removed to show internal components of the vehicle.

With reference to FIGS. 1 and 2, a three-wheeled vehicle 10 has a front end 12 and a rear end 14 defined consistently with the forward travel direction of the vehicle 10. The vehicle 10 has a frame 16. A left front wheel 18 mounted to the frame 16 by a left front suspension assembly 20, a right front wheel 18 mounted to the frame 16 by a right front suspension assembly 20, and a single rear wheel 22 mounted to the frame 16 by a rear suspension assembly 24. The left and right front wheels 18 and the rear wheel 22 each have a tire secured thereto. The front wheels 18 are disposed equidistant from a longitudinal centerline of the vehicle 10, and the rear wheel 22 is centered with respect to the longitudinal centerline.

In the illustrated embodiment, each front suspension assembly 20 is a double A-arm type suspension, also known as a double wishbone suspension. It is contemplated that other types of suspensions, such as a McPherson strut suspension, or swing arm could be used. Each front suspension assembly 20 includes an upper A-arm 26, a lower A-arm 28 and a shock absorber 30. A sway bar 32 is connected to the front members of both lower A-arms 74 to reduce motion of one of the left and right front wheels 14 with respect to the other of the left and right front wheels 14, and to thereby reduce rolling motion of the vehicle 10. The rear suspension assembly 24 includes a swing arm 34 and a shock absorber 36. The swing arm 34 is pivotally mounted at a front thereof to the frame 16. The rear wheel 22 is rotatably mounted to the rear end of the swing arm 34 which extends on a left side of the rear wheel 22. The shock absorber 36 is connected between the swing arm 34 and the frame 16.

The vehicle 10 has a laterally centered straddle seat 38 mounted to the frame 16. In the illustrated embodiment, the straddle seat 38 is intended to accommodate a single adult-sized rider, i.e. the driver. It is however contemplated that the straddle seat 38 could be configured to accommodate more than one adult-sized rider (the driver and one or more passengers). A driver footrest 40 is disposed on either side of the vehicle 10 and vertically lower than the straddle seat 38 to support the driver's feet. In the embodiment of the vehicle 10 illustrated herein, the driver footrests 40 are in the form of foot pegs disposed longitudinally forward of the straddle seat 38. It is also contemplated that the footrests 40 could be in the form of footboards. It is contemplated that the vehicle 10 could also be provided with one or more passenger footrests disposed rearward of the driver footrest 26 on each side of the vehicle 10, for supporting a passenger's feet when the seat 38 is configured to accommodate one or more passengers in addition to the driver. A brake operator (not shown), in the form of a foot-operated brake pedal, is connected to the right driver footrest 40 for braking the vehicle 10.

A handlebar 42, which is part of a steering assembly 44, is disposed in front of the seat 38. The handlebar 42 is used by the driver to turn the front wheels 18 to steer the vehicle 10. A central portion of the handlebar 42 is connected to an upper end of a steering column 46. From the handlebar 42, the steering column 46 extends downwardly and leftwardly. A lower end of the steering column 46 is connected to a number of arms and linkages 48 that are operatively connected to the front wheels 18 such that turning the handlebar 42 turns the steering column 44 which, through the arms and linkages 48, turns the front wheels 18. It is contemplated that the steering assembly 44 could include a power steering unit to facilitate steering of the vehicle 10.

A throttle operator 50 of the vehicle 10 is provided as a rotatable right hand grip on the handlebar 42. The throttle operator 50 is rotated by the driver to control power delivered by an engine 52 of the vehicle 10. It is contemplated that the throttle operator could be in the form of a thumb-operated or finger-operated lever and/or that the throttle operator 50. The handlebar 42 has connected thereto various controls such as an engine start-up button and an engine cut-off switch located laterally inwardly of the left and right hand grips. A display cluster 54 is provided forwardly of the handlebar 42. The display cluster 54 provides information to the driver of the vehicle 10 such as vehicle speed, engine speed, fuel lever, and other notifications and warnings, such as vehicle maintenance related notifications.

The frame 16 supports and houses the engine 52 which located forwardly of the straddle seat 38. In the illustrated embodiment of the vehicle 10, the engine 52 is an inline, three-cylinder, four-stroke internal combustion engine, but could be a two-stroke or diesel internal combustion engine. It is also contemplated that the engine 52 could have more or less cylinders. It is also contemplated that the engine 52 could have cylinders arranged in a configuration other than inline. For example, the engine 52 could be a V-type, two-cylinder, two-stroke internal combustion engine.

Figure 4:
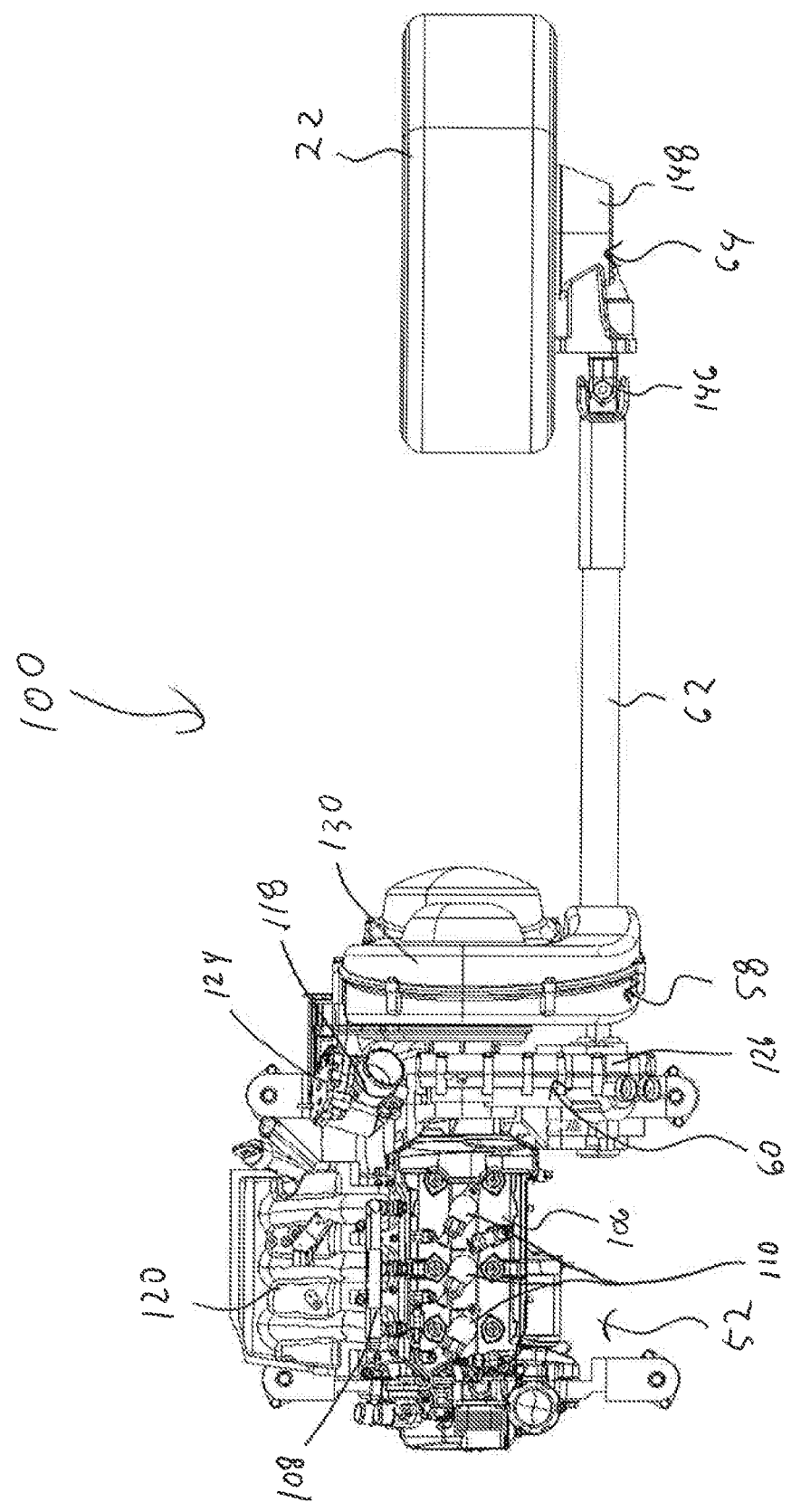
FIG. 4 is a top plan view of a powertrain of the vehicle of FIG. 1.
Figure 5:
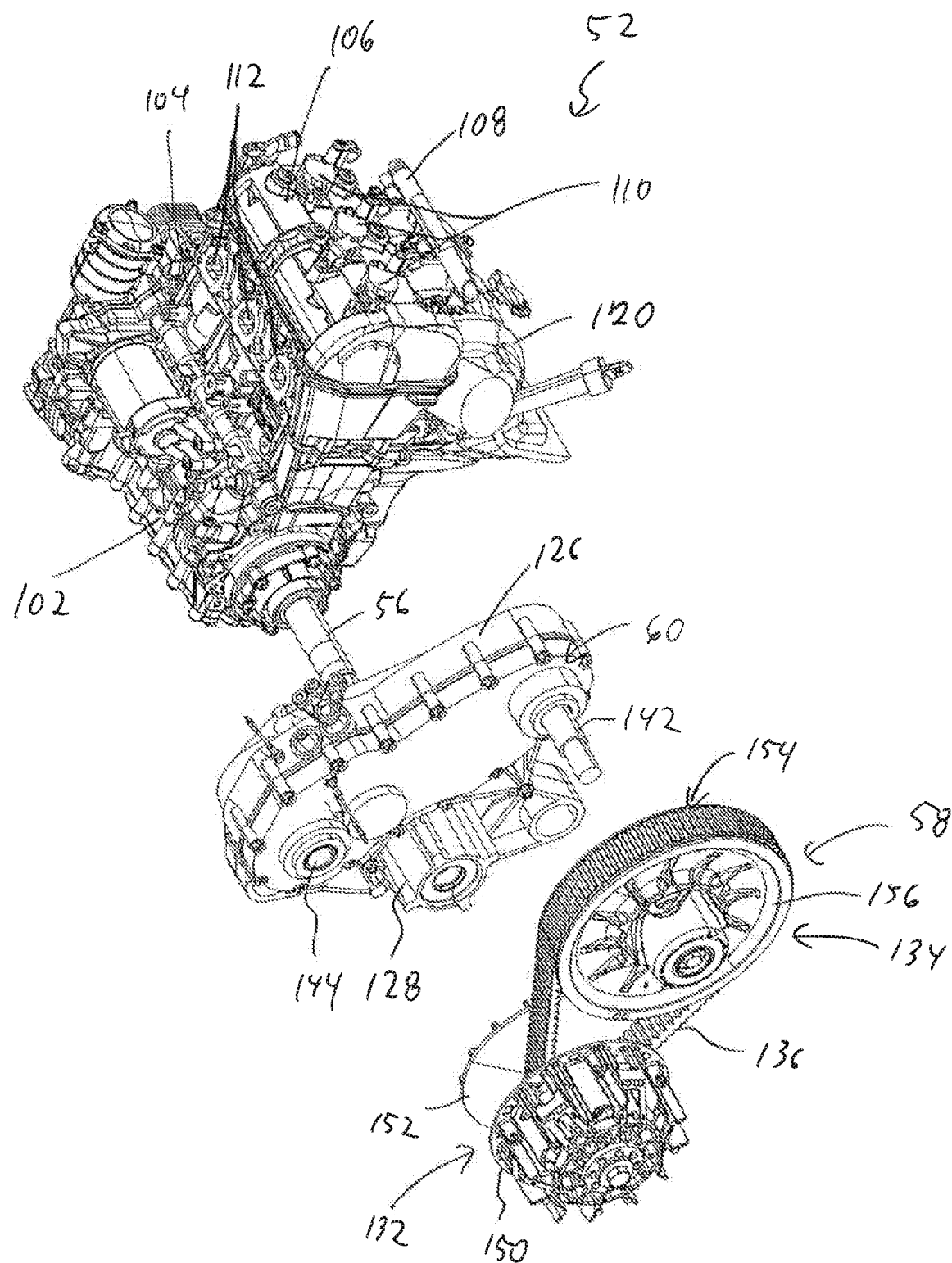
FIG. 5 is a partially exploded view of the engine, transmission and CVT of the vehicle of FIG. 1.

The engine 52 is operatively connected to the rear wheel 22 to drive the rear wheel 16. With reference to FIGS. 4 and 5, the engine is operatively connected to the rear wheel 22 via an engine output shaft 56, a continuously variable transmission (CVT) 58, a transfer case 60, a driveshaft 62, and a gear assembly 64. It is contemplated that the engine 52 could be operatively connected to the front wheels 18 instead of, or in addition to, the rear wheel 22. The engine 52, the engine output shaft 56, the CVT 58, the transfer case 60, the driveshaft 62 and the gear assembly 64 form part of a vehicle powertrain 100 which will be described below in further detail. As can be seen, the transfer case 60 is disposed rearward of the engine 52, and the CVT 58 is disposed rearward of the transfer case 60. The CVT 34 and the transfer case 36 form a transmission assembly of the vehicle 10.

With reference to FIG. 2, a fuel tank 66 supplies fuel to the engine 52. The fuel tank 66 is disposed longitudinally rearward of the CVT 58. The straddle seat 38 is disposed behind the fuel tank 66.

Also with reference to FIG. 2, a radiator 68 is mounted to the vehicle frame 16 and in front of the engine 52. The radiator 68 is fluidly connected to the engine 52 for cooling engine coolant used to cool the engine 52.

With reference to FIGS. 1 and 2, each of the two front wheels 18 and the rear wheel 22 is provided with a brake 70. Each brake 70 is a disc-type brake mounted onto a hub of its respective wheel 18 or 22. Other types of brakes are contemplated. Each brake 70 includes a rotor mounted onto the wheel hub and a brake caliper straddling the rotor. Brake pads are mounted to the caliper so as to be disposed between the rotor and the caliper on either side of the rotor. The foot-operated brake operator is operatively connected to the brakes 70 provided on each of the two front wheels 18 and the rear wheel 22. It is contemplated that the brake operator could be in the form of a hand-operated brake lever connected to the handlebar 42 instead of or in addition to the foot-operated brake pedal as shown herein.

The vehicle 10 also includes a number of fairings 72, only some of which have been labeled in FIG. 1 for clarity, which are connected to the frame 16 to enclose and protect the internal components of the vehicle 10 such as the engine 52.

Figure 3:
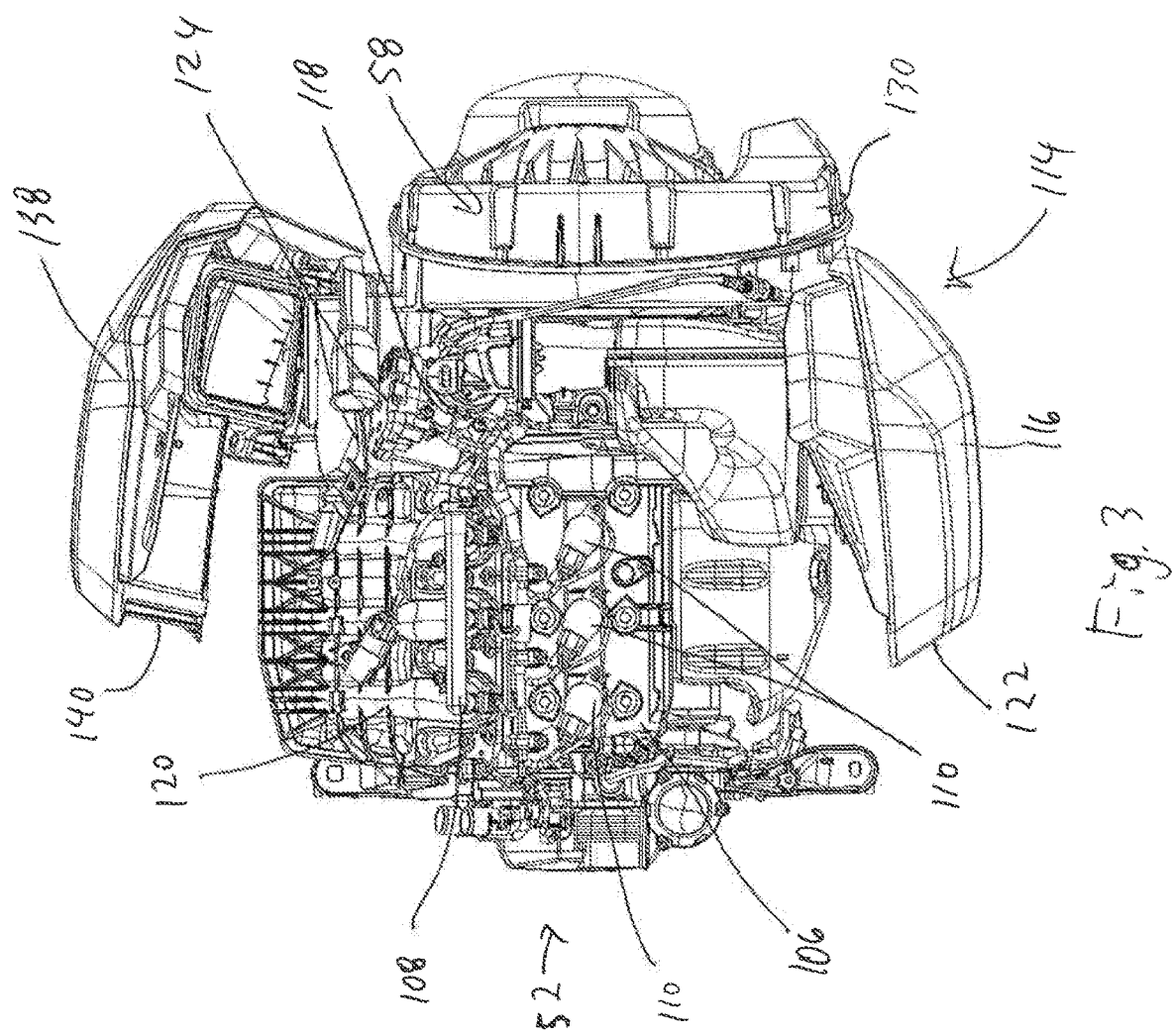
FIG. 3 is a top plan view of an engine, air intakes, transmission and continuously variable transmission (CVT) of the vehicle of FIG. 1.

The powertrain 100 now be described with reference to FIGS. 3 to 5.

With reference to FIG. 5, the engine 52 has a crankcase 102, a cylinder block 104 disposed on and connected to the crankcase 102, and a cylinder head assembly 106 disposed on and connected to the cylinder block 104. A crankshaft (not shown) is housed in the crankcase 102. The cylinder block 104 defines three cylinders (not shown). A piston (not shown) is disposed inside each cylinder for reciprocal movement therein. The lower end of each piston is linked by a connecting rod (not shown) to the crankshaft. A combustion chamber is defined in the upper portion of each cylinder by the walls of the cylinder, the cylinder head assembly 106 and the top of the piston. Explosions caused by the combustion of an air/fuel mixture inside the combustion chambers cause the pistons to reciprocate inside the cylinders. The reciprocal movement of the pistons causes the crankshaft to rotate, thereby allowing power to be transmitted from the crankshaft to the rear wheel 22. The cylinder head assembly 106 includes a fuel injector (not shown) for each cylinder. The fuel injectors receive fuel from the fuel tank 66 via a fuel rail 108. A spark plug 110 is provided in the cylinder head assembly 106 for each cylinder to ignite the air/fuel mixture in each cylinder. The exhaust gases resulting from the combustion of the air-fuel mixture in the combustion chamber are removed from the engine 52 and are then released to the atmosphere via exhaust ports 112 of the engine 52 and an exhaust system (not shown). The exhaust system includes an exhaust manifold connected to a left side of the engine 52 to receive exhaust gas from the exhaust ports 112 and a muffler to receive exhaust gas from the exhaust manifold.

The engine 52 receives air from an air intake system 114. As can be seen in FIG. 3, the air intake system 114 includes an air intake assembly 116, a throttle body 118 and an air intake manifold 120. The air intake assembly 116 is disposed on the left side of a centerline of the engine 52 (defined by the output shaft 56). The throttle body 118 and the air intake manifold 120 are disposed on the right side of the centerline of the engine 52. The air intake assembly 116 defines a forwardly facing air inlet 122. The air intake assembly 116 also includes a number of features such as internal walls and an air filter to help prevent the entry of dust and water into the engine 52. The throttle body 118 includes a throttle valve (not shown) actuated by a throttle motor 124 to control a flow of air to the engine 52. The air intake manifold 120 is connected to the engine 52 and defines three outlets (one per cylinder) to supply air to the air intake ports (not shown) of the engine 52. During operation, air flows into the air intake assembly 116 via the air inlet 122, the through the throttle body 118, then through the air intake manifold 120 and finally to the combustion chambers of the engine 52.

With reference to FIG. 5, the transfer case 60 includes a transfer case housing 126 which is mounted to the rear end of the engine 52 via bolts The transfer case 60 also includes an input sprocket, an output sprocket, and a chain (all not shown) enclosed by the transfer case housing 126. The output sprocket is operatively connected to the input sprocket by the chain. It is also contemplated that the output sprocket could be driven by the input sprocket via a belt or a gear train.

The engine output shaft 56 extends rearwardly from the rear end of the crankcase 102, through an engine output shaft housing 128 (FIG. 5) connected to the transfer case housing 126 to connect to the CVT 58. In the illustrated embodiment, the engine output shaft 56 is connected directly to the crankshaft and serves as an extension thereof, but it is contemplated that the engine output shaft 56 could be operatively connected to the crankshaft via one or more gears. It is also contemplated that the engine output shaft 56 could be integrally formed with the crankshaft.

The CVT 58 includes a CVT housing 130 (FIG. 3) disposed longitudinally rearward of the transfer case 60. With reference to FIG. 5, the CVT 58 also includes a drive pulley 132, a driven pulley 134 and a drive belt 136 wrapped around the drive pulley 132 and the driven pulley 134 for driving the driven pulley 134. The pulleys 132, 134 and the drive belt 136 are disposed inside the CVT housing 130. The drive belt 136 is made of a polymer, such as rubber for example.

In order to cool the drive pulley 132, the driven pulley 134 and the drive belt 136, a CVT air intake assembly 138 (FIG. 3) supplies air inside the CVT housing 130. The CVT air intake assembly 138 is disposed on a right side of the engine 52 and defines a forwardly facing air inlet 140. The CVT air intake assembly 138 includes a number of features such as internal walls to help prevent the entry of dust and water into the CVT housing 130.

Returning to FIG. 5, the drive pulley 132 is mounted to the rear end of the engine output shaft 56 extending rearwardly from the crankcase 102 so as to rotate therewith. The drive pulley 132 is disposed in the lower portion of the CVT housing 150. The driven pulley 134 is mounted on the rear end of a shaft 142. The driven pulley 134 is disposed above the drive pulley 132 in the illustrated embodiment of the vehicle 10. It is however contemplated that the driven pulley 134 could be disposed in a different position with respect to the drive pulley 132. It is contemplated that the driven pulley 134 could be disposed lower than the drive pulley 132, for example, if the drive pulley 132 was connected to the engine output shaft 56 indirectly instead of directly as shown herein.

The input sprocket of the transfer case 60 is mounted to the front end of the shaft 142. The output sprocket of the transfer case 60 is disposed vertically below the input sprocket and is laterally offset toward the left side thereof. The output sprocket of the transfer case 60 selectively engages the driveshaft 62 via a gear selection assembly (not shown) for rotating the driveshaft 62 and thereby the rear wheel 22. The gear selection assembly is disposed inside the transfer case housing 126 in the illustrated embodiment of the vehicle 10. It is however contemplated that the gear selection assembly could be disposed outside the transfer case housing 126. The driveshaft 62 extends through the opening 144 (FIG. 5) defined in the transfer case 60 to engage the gear selection assembly. The gear selection assembly includes a forward gear, a reverse gear and a neutral position.

Referring now to FIG. 4, the rear end of the driveshaft 62 is connected to the gear assembly 64. The gear assembly 64 includes a universal joint 146, a pinion (not shown), a bevel gear (not shown) and a housing 148. The pinion and bevel gear are disposed inside the housing 148. The universal joint 146 is connected between the rear end of the driveshaft 62 and the pinion. The pinion engages the bevel gear which is fixed to the hub of the rear wheel 22.

Returning to FIG. 5, the CVT 58 will be described in more detail. The drive pulley 132 includes a movable sheave 150 that can move axially relative to a fixed sheave 152 to modify an effective diameter of the drive pulley 132. The moveable sheave 150 has centrifugal weights that push the movable sheave 150 relative to the fixed sheave 152 as the speed of rotation of the drive pulley 132 increases such that the effective diameter of the drive pulley 132 increases. Similarly, the driven pulley 134 includes a movable sheave 154 that can move axially relative to a fixed sheave 156 to modify an effective diameter of the driven pulley 134. The effective diameter of the driven pulley 134 is in inverse relationship to the effective diameter of the drive pulley 132. The movable sheaves 150 and 154 are on opposite sides of the drive belt 136.

Figure 6:
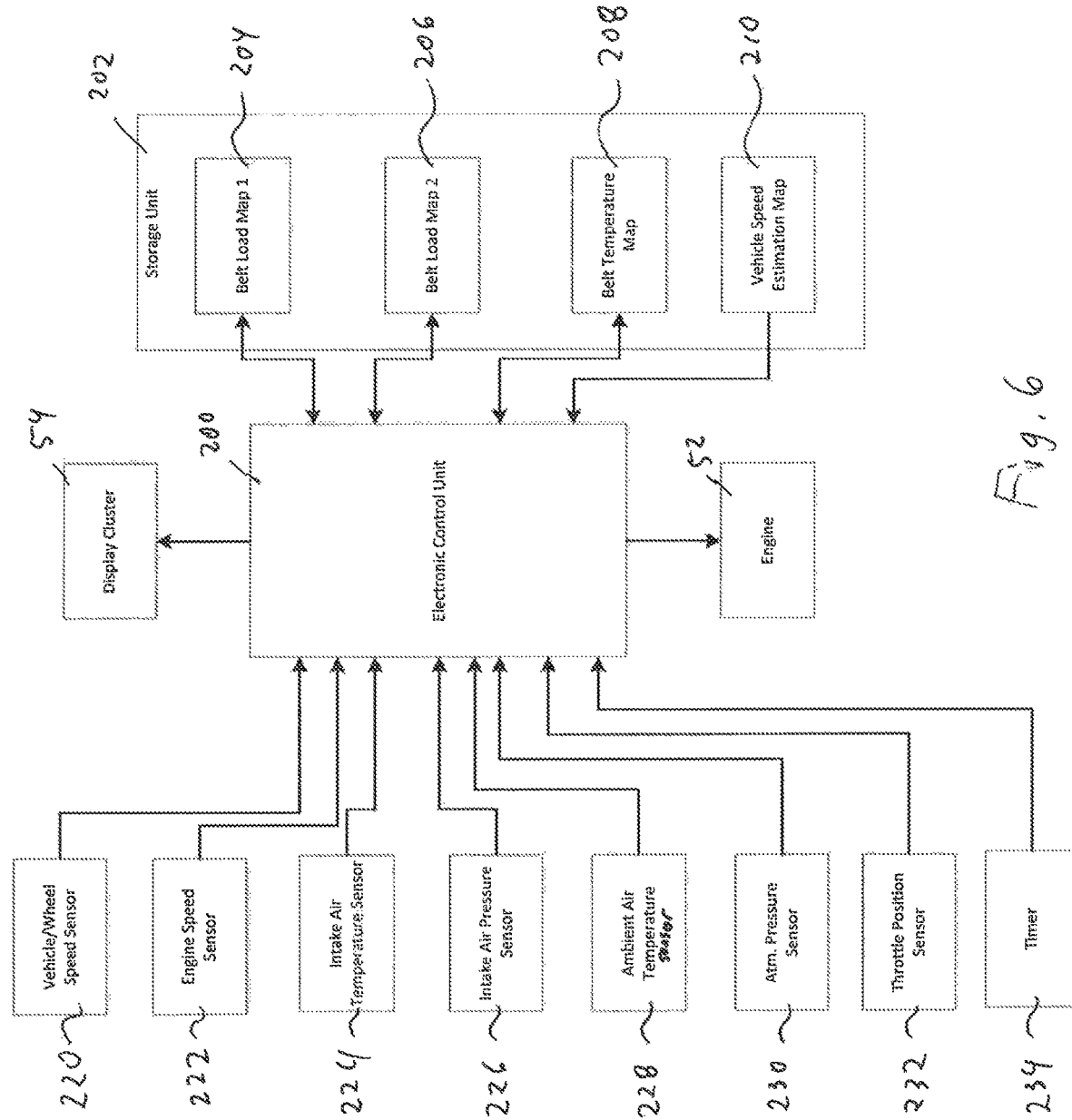
FIG. 6 is a schematic representations of various sensors and other components of the vehicle of FIG. 1.

Turning now to FIG. 6, various electronic components of the vehicle 10 will be described.

The vehicle 10 includes an electronic control unit (ECU) 200 that receives signals from a number of sensors, some of which are described below, and uses these signals to control an operation of the engine 52 and other components of the vehicle 10, such as the display cluster 54. The ECU 200 includes a non-transitory computer readable medium (not shown) and a processor (not shown). The processor of the ECU 200 is configured to perform a number of operations including the methods for estimating wear of the drive belt 136 described below. The ECU 200 is electronically connected to an electronic storage unit 202, such as a hard drive or a flash drive for example, which stores data sent from and/or to be used by the ECU 200 and stores a number of control maps, some of which are described below, to be used by the ECU 200. It is contemplated that the storage unit 202 and/or the display cluster 54 could be integrated with the ECU 200. It is also contemplated that the storage unit 202 could be split into multiple storage units. Similarly it is contemplated that the functions of the ECU 200 could be split between multiple ECUs.

Based on the signals received from at least some of the various sensors communicating with the ECU 200, the ECU 200 controls the operation of the fuel injectors, the spark plugs 110 and the throttle body 118 in order to control an engine torque output by the engine 52 in order to control a speed and acceleration of the vehicle 10.

Based on the signals received from some of the various sensors communicating with the ECU 200, the ECU 200 causes the display cluster 54 to display various vehicle parameters, such as, but not limited to, vehicle speed, engine speed, fuel level, engine temperature, distance traveled (odometer function) and ambient temperature. The ECU 200 can also cause the display cluster 54 to display various warnings for the driver of the vehicle, such as, but not limited to, "check engine", "check tire pressure", "maintenance required" and "battery voltage low". These warnings can be words displayed on a screen or can be in the form of an icon displayed on the cluster or some other visual, auditory or haptic indicator.

Figure 7:
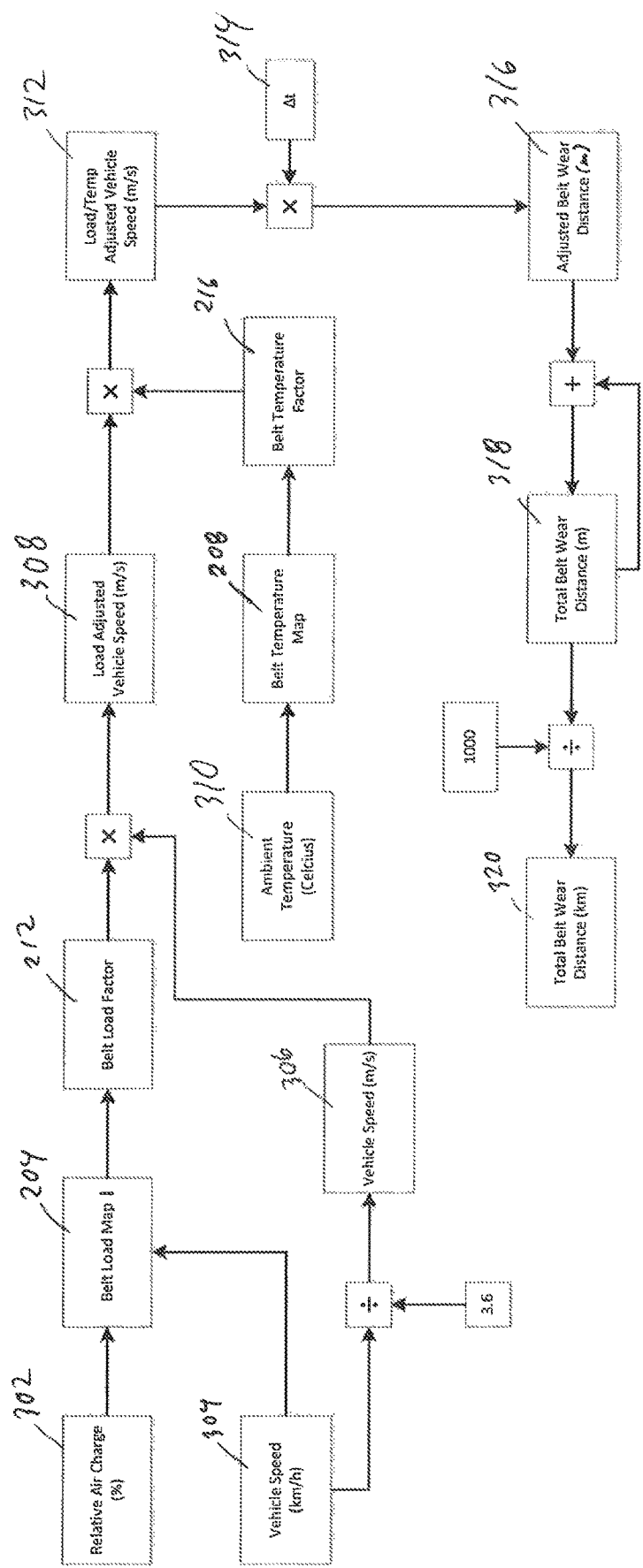
FIG. 7 is a block diagram illustrating a method for estimating wear of a drive belt of the CVT of the vehicle of FIG. 1.

In the present embodiment, the storage unit 202 stores two belt load maps 204, 206, a belt temperature map 208 and a vehicle speed estimation map 210 that are used in the methods described below. The storage unit 202 also stores other maps used by the ECU 200 to perform other control methods used in the operation of the vehicle, such as for controlling the operation of the engine 52. The two belt load maps 204, 206 are used to determine corresponding belt load factors 212, 214 (FIGS. 7, 10) based on different inputs. The belt temperature map 208 is used to determine a belt temperature factor 216 (FIG. 7). The vehicle speed estimation map 210 is used to provide an estimated vehicle speed 218 (FIG. 10) when the sensor responsible for providing a signal indicative of vehicle speed to the ECU 200 is unavailable, due to sensor failure for example, or is sending faulty signals. It is contemplated that the vehicle speed estimation map 210 could be a collection of maps the outputs of which can be used together to estimate the vehicle speed. It is contemplated that one or more of the maps 204, 206, 208 and 210 could be replaced by a table containing corresponding data or one or more equations used to provide the same output as the maps 204, 206, 208 and 210. Also, although the same reference numerals for the maps 204, 206, 208, 210 in the various methods described below, it is contemplated that the maps 204, 206, 208, 210 could be different in different methods.

A vehicle or wheel speed sensor 220 communicates with the ECU 200 to provide a signal indicative of vehicle speed to the ECU 200. In embodiments where the sensor 220 is a vehicle speed sensor 220, the sensor 220 can be in the form of a global position system (GPS) unit that sends a vehicle position signal to the ECU 200. Based on changes in position over time, which is obtained from the timer 234 described below or an internal timer of the ECU 200, the ECU 200 is able to determine the vehicle speed. It is also contemplated that the GPS unit could have an integrated timer allowing it to calculate the vehicle speed and send a signal representative of the vehicle speed to the ECU 200. The vehicle speed sensor 220 could also be a pitot tube or another type of sensor used to measure linear speed. In embodiments where the sensor 220 is a wheel speed sensor 220, the wheel speed sensor 220 senses a rotational speed of a wheel, such as the rear wheel 22, and sends a signal representative of this speed to the ECU 200. The ECU 200 can then calculate the vehicle speed using this signal and the diameter of the rear wheel 22. It is contemplated that the wheel speed sensor 220 could measure the rotational speed of one of the front wheels 18 instead. It is also contemplated that multiple wheel speed sensors 220 could be used to measure the rotational speed of two or all three wheels 18, 20. It is also contemplated that the sensor 220 could instead be used to sense a rotational speed of the driven pulley 134, or a rotational speed of a rotating element operatively connecting the driven pulley 134 to the rear wheel 22, such as the driveshaft 62, the shaft 142 or part of the gear assembly 64 for example, and use the signal from the sensor 220 to determine vehicle speed. It is also contemplated that the vehicle 10 could be provided with both a vehicle speed sensor and a wheel speed sensor or any combination of the sensors described above that can be used to determine vehicle speed.

An engine speed sensor 222 communicates with the ECU 200 to provide a signal indicative of engine speed to the ECU 200. In the present embodiment, the engine speed sensor 222 senses a rotational speed of the crankshaft of the engine 52. In another embodiment, the engine speed sensor 222 senses a rotational speed of the output shaft 56 of the engine 52. In another embodiment, the engine speed sensor 222 senses a rotational speed of the drive pulley 132 which rotates at the same speed as the crankshaft and the output shaft 56.

An intake air temperature sensor 224 communicates with the ECU 200 to provide a signal indicative of the temperature of the air being supplied to the engine 52. The intake air temperature sensor 224 is positioned to sense the temperature of the air in the air intake system 114.

An intake air pressure sensor 226 communicates with the ECU 200 to provide a signal indicative of the pressure of the air being supplied to the engine 52. The intake air pressure sensor 226 is positioned to sense the pressure of the air in the air intake system 114. It is contemplated that a CVT housing pressure sensor positioned within the CVT housing 150 and in communication with the ECU 200 for providing a signal indicative of the pressure of the air within the CVT housing 150 could be provided.

An ambient air temperature sensor 228 communicates with the ECU 200 and senses ambient air temperature to provides a signal indicative of the temperature of the ambient air to the ECU 200.

An atmospheric pressure sensor 230 communicates with the ECU 200 and senses atmospheric air pressure to provide a signal indicative of the atmospheric pressure to the ECU 200.

A throttle position sensor 232 communicates with the ECU 200 and senses a position of the throttle valve of throttle body 118 to provide a signal indicative of this position to the ECU 200.

A timer 234 communicates with the ECU 200 and provides signals indicative of time elapsed since the vehicle 10 has been turned on and/or the current time. The ECU 200 uses the time provided by the time 234 in various calculations.

Turning now to FIGS. 7 to 14, various methods for estimating wear of the drive belt 136 will be described. In each of these embodiments, two belt wear-affecting factors are determined based on various operating parameters of the vehicle. Belt wear-affecting factors are factors which are based on operating characteristics of the CVT 58 which will have an effect of the wear of the drive belt 136. These include, but are not limited to, the load on the drive belt 136, changes in speed of the drive belt 136, the forces applied by the sheaves 150, 152, 154, 156 on the drive belt 136, the ratio of the effective diameters of the pulleys 132, 134 (CVT ratio) and the temperature of the drive belt 136. In all of the methods described below, the two belt wear-affecting factors used are the belt load factor 212 and the belt temperature factor 216. The belt load factor 212 is associated with the load applied on the drive belt 136. The belt temperature factor 216 is associated with the temperature of the drive belt 136. It is contemplated that other factors could be used and that more or less than two factors could be used. The two belt wear-affecting factors are applied to a belt wear-representative parameter. The belt wear-representative parameter is a parameter that has a relation to the lifespan of the drive belt 136. For example, some drive belt manufacturers rate the life of the drive belt 136 in terms of vehicle travel distance or in terms of drive belt use time. Other examples of belt wear-representative parameters include, but are not limited to, vehicle speed, drive belt rotations, engine rotations, and drive belt wear units. A drive belt wear unit is a generic parameter used to correlate to the lifespan of the drive belt 136. For example, a drive belt that is rated for 15000 km, could be said to be rated for 15000 drive belt wear units, but it does not have to be one-to-one as long as the other values used in the method are used accordingly. The methods described below use different belt wear-representative parameters.

When rating the life of a drive belt 136, drive belt manufacturers make certain assumption regarding the way the drive belt 136 will be used and the environment the drive belt 136 will be used in. So a drive belt 136 rated for 15000 km of vehicle travel distance should need replacement after 15000 km. However, depending on how the drive belt 136 is used and the environment is used in, it may have to be replaced before 15000 km is reached, or may only need to be replaced after more than 15000 km. The belt wear-affecting factors are used to adjust the belt wear-representative parameter to be closer to a value corresponding to an equivalent amount of wear under "normal" operating conditions. For example, if the vehicle 10 travels 2 meters under the conditions corresponding to those used when rating the life of the drive belt 136, the drive belt 136 will have the amount of wear expected from 2 meter of vehicle travel distance. However, if the vehicle 10 travels 2 meters but during hard acceleration and in a very hot environment, the drive belt 136 will wear more than in the previous example (i.e. under the conditions corresponding to those used when rating the life of the drive belt 136). The belt wear-affecting factors are used to account for this extra wear. In the previous example, if the drive belt 136 has 50% more wear than would normally be expected, then the belt wear-affecting factors, if properly determined, will adjust the 2 meters of actual vehicle travel distance to count as 3 meters of vehicle travel distance (i.e. 2 m×1.5). Since the 2 meters of actual vehicle travel distance result in an amount of wear of the drive belt 136 equivalent to that which would be expected from 3 meters of vehicle travel distance under the conditions corresponding to those used when rating the life of the drive belt 136, it is the vehicle travel distance adjusted by the belt wear-affecting factors (i.e. 3 meters), that is used to calculate the amount of life of the drive belt 136 that has been spent.

In the methods described below, various alternatives will be provided. It should be understood that alternatives proposed in one of the methods could be applied in the other methods even if these alternatives are not specifically recited in these other methods. Also, similar elements in the various methods have been labeled with the same reference numerals.

The methods described below also make reference to an operating parameter of the vehicle 10 called relative air charge, which is expressed as a percentage. Air charge corresponds to the quantity of air that is supplied in the cylinder of the engine 52 for one combustion cycle. Relative air charge represents the comparison of an air charge to a standard air charge occurring under certain predetermined conditions. The predetermined conditions can be Standard Temperature and Pressure (STP, 0 Celsius, 1 bar), Normal Temperature and Pressure (NTP, 20 Celsius, 1 Atmosphere), Standard Ambient Temperature and Pressure (SATP, 25 Celsius, 101.325 kPa), or some other temperature and pressure. As would be understood, the belt load map 204 will need to be modified depending on the predetermined conditions for temperature and pressure are used since, for a given air charge, the relative air charge will vary depending on which predetermined conditions are used to calculate the standard air charge. In the present embodiment, the relative air charge is calculated by the ECU 200 based on the engine speed, the intake air temperature, the intake air pressure, the atmospheric pressure and the throttle position sensed by the sensors 222, 224, 226, 230 and 232 respectively. It is contemplated that the relative air charge could be determined by the ECU 200 by inputting the same operating parameters of the vehicle 10 into one or more maps or tables. It is also contemplated that the relative air charge could be determined using different operating parameters of the vehicle 10 depending on the sensors available. For example, in a vehicle equipped with an air flow meter sensing air flow through the air intake system, the air flow meter could be used to determine the relative air charge.

Turning now to FIG. 7, a first method 300 for estimating wear of the drive belt 136 will be described. The method 300 begins by inputting a belt load-representative parameter and a belt speed-representative parameter into the belt load map 204. In the method 300, the belt load-representative parameter is relative air charge 302 and the belt speed-representative parameter is vehicle speed 304 in km/h. The air charge 302 is calculated by the ECU 200 as described above and the vehicle speed 304 is obtained by the ECU 200 from the signal received from the speed sensor 220. It is contemplated that the relative air charge 302 and the vehicle speed 304 could be replaced by other belt load-representative and belt speed-representative parameters, with the belt load map 204 being modified accordingly. For example, it is contemplated that the relative air charge 302 could be replaced by engine load, engine torque, CVT ratio, air charge or any other engine parameter that correlates sufficiently with engine load, and the vehicle speed 304 could be replaced by engine speed, drive belt speed, a rotational speed of the driven pulley 134, a rotational speed of the rear wheel 22, the rotational speed of a rotating element operatively connecting the driven pulley 134 to the rear wheel 22, or any other vehicle parameter that correlates sufficiently with belt speed.

Figure 8:
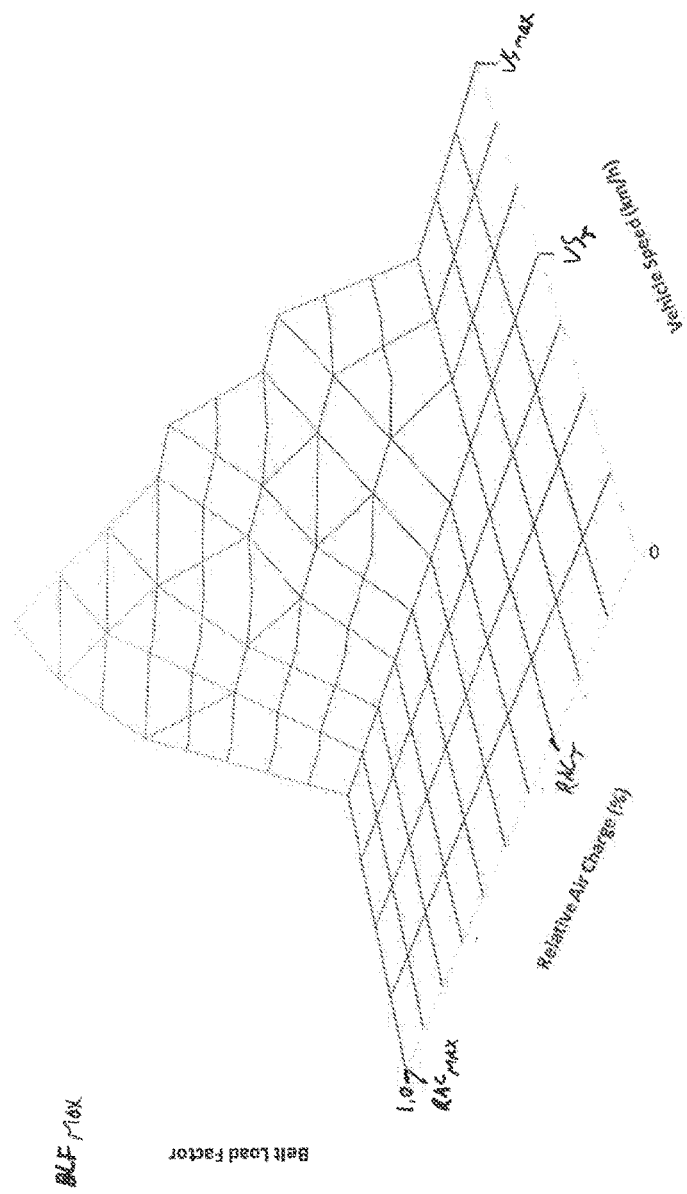
FIG. 8 is a map used for determining a belt load factor in the method of FIG. 7.

As can be seen in FIG. 8, in the belt load map 204, for each combination of relative air charge 302 and vehicle speed 304 the map provides a corresponding belt load factor 212. As can be seen in FIG. 8, the relative air charge 302 goes up to a maximum relative air charge $RAC_{MAX}$. It is contemplated that the maximum relative air charge $RAC_{MAX}$ could go above 100%. As can also be seen in FIG. 8, the minimum belt load factor is 1.0, but it is contemplated that it could be less than one if the operation of the vehicle 10 result in less wear of the drive belt 136 than accounted for in a predetermined threshold belt wear distance, discussed further below. In the belt load map 204 shown in FIG. 8, the belt load factor is 1.0 when the vehicle speed 304 is less than a transition vehicle speed $VS_T$ or when the relative air charge 302 is less than a transition relative air charge $RAC_T$. This flat region is referred to herein as the normal wear region. Also, in the belt load map 204, the belt load factor is greater than 1.0 when the vehicle speed 304 is greater than the transition vehicle speed $VS_T$ and the relative air charge 302 is greater than the transition relative air charge $RAC_T$. This raised region is referred to herein as the extra wear region. As will be discussed below, the belt temperature map 208 also has a normal wear region and an extra wear regions. As long as the vehicle 10 is operated in the normal wear regions, the life of the drive belt 136 will be as expected, but operating the vehicle 10 in any one of the extra wear regions will result in a shorter belt life due to the extra wear experienced by the drive belt 136 when the vehicle 10 is operated under these conditions. The belt load map 204 and the belt temperature map 208 can be determined experimentally.

Returning to the method 300 in FIG. 7, the ECU 200 obtains the belt load factor 212 from the belt load map 204. Then the ECU 200 multiplies the belt load factor 212 by the vehicle speed 306 to obtain a load adjusted vehicle speed 308 (i.e. the vehicle speed 306 adjusted to take into consideration the belt load factor 212). The vehicle speed 306 is equal to the vehicle speed 304 but expressed in meters per second instead of in kilometers per hour. As can be seen in FIG. 7, this is done by dividing the vehicle speed 304 by 3.6.

The method 300 continues by inputting a belt temperature-representative parameter into the belt temperature map 208. In the method 300, the belt temperature-representative parameter is ambient air temperature 310. The ambient air temperature 310 is obtained by the ECU 200 from the signal received from the ambient air temperature sensor 228, which correlates sufficiently with drive belt temperature in a vehicle such as the vehicle 10. It is contemplated that the ambient air temperature 310 could be replaced by another belt temperature-representative parameter, with the belt temperature map 208 being modified accordingly. For example, it is contemplated that the ambient air temperature 310 could be replaced by CVT air intake temperature, CVT housing temperature, or drive belt temperature provided by a CVT air intake temperature sensor, a CVT housing air temperature sensor and a belt temperature sensor respectively. The CVT air intake temperature is a temperature of the air in the CVT air intake assembly 138. The CVT housing temperature is a temperature of the air in the CVT housing 130. The drive belt temperature is the actual temperature of the drive belt 136 sensed at a given location or locations along its travel path.

Figure 9:
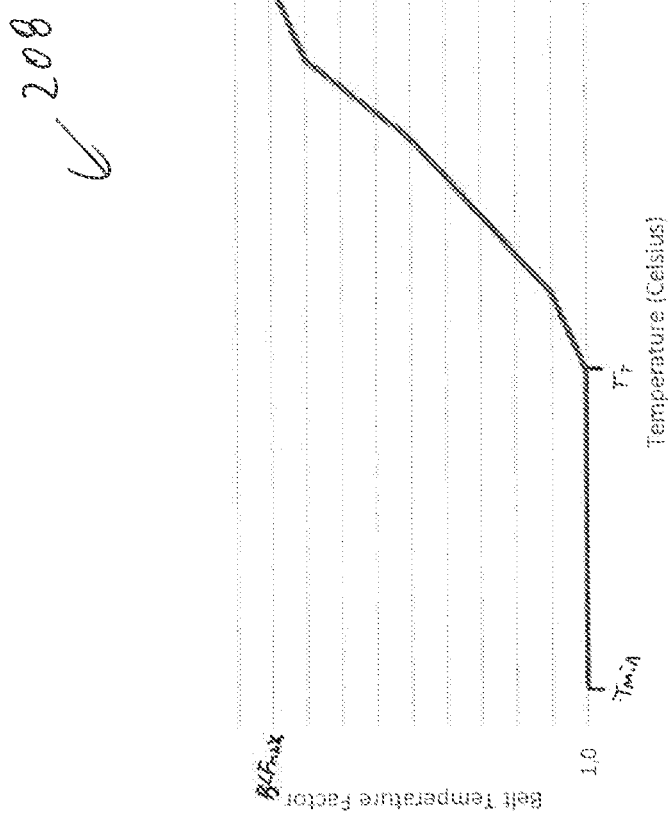
FIG. 9 is a map used for determining a belt temperature factor in the method of FIG. 7.

As can be seen in FIG. 9, in the belt temperature map 208, for each value of ambient air temperature 310 the map provides a corresponding belt temperature factor 216. As can be seen in FIG. 9, the air temperature varies between a minimum temperature $T_{min}$ and a maximum temperature $T_{max}$. The values of the minimum temperature $T_{min}$ and the maximum temperature $T_{max}$ will vary depending on the specific vehicle and its operating environment. For example, in a snowmobile such as the snowmobile 830 described below, the range of temperatures would include lower temperatures than for the vehicle 10. As can also be seen in FIG. 9, the minimum belt temperature factor is 1.0, but it is contemplated that it could be less than one if the operation of the vehicle 10 result in less wear of the drive belt 136 than accounted for in a predetermined threshold belt wear distance, discussed further below. In the belt temperature map 208 shown in FIG. 9, the belt load factor is 1.0 when the ambient air temperature 310 is less than a transition temperature $T_T$. This flat region is referred to herein as the normal wear region. Also, in the belt temperature map 208, the belt temperature factor is greater than 1.0 when the ambient air temperature 310 is greater than the transition temperature $T_T$. This raised region is referred to herein as the extra wear region.

Returning to the method 300 in FIG. 7, the ECU 200 obtains the belt temperature factor 216 from the belt temperature map 208. Then the ECU 200 multiplies the belt temperature factor 216 by the load adjusted vehicle speed 308 to obtain a load and temperature adjusted vehicle speed 312 (i.e. the load adjusted vehicle speed 308 adjusted to take into consideration the belt temperature factor 216).

It is contemplated that the vehicle speed 306 could first be multiplied by the belt temperature factor 216 and that the result of this multiplication could then be multiplied by the belt load factor 212 to obtain the load and temperature adjusted vehicle speed 312.

In the method 300 of FIG. 7, drive belt life is estimated in terms of vehicle travel distance. As such, in this method a total belt wear-representative parameter is also estimated in terms of vehicle travel distance, which is referred to herein as the total belt wear distance 318. As such, the load and temperature adjusted vehicle speed 312 is converted to distance by multiplying it by a time interval 314 to obtain an adjusted belt wear distance 316. The time interval 314 corresponds to the time between each cycle of the method 300. In one example, the time interval 314 is 10 milliseconds, but it could be more or less depending on the computing power of the ECU 200 and the response time of the sensors, amongst other factors.

The adjusted belt wear distance 316 is then added to the total belt wear distance 318 obtained from a previous cycle of the method 300 in order get an updated total belt wear distance 318. When the drive belt 136 is brand new, the total belt wear distance 318 is zero meter and increases as the vehicle 10 is used. The total belt wear distance 318, which is in meters, is then divided by 1000 to have a total belt wear distance 320 in kilometers. The total belt wear distance 320 is then compared to the threshold belt wear distance. If the total belt wear distance 320 is greater than or equal to the threshold belt wear distance, the ECU 200 sends a signal to the display cluster 54 to provide an indication that there is a need for transmission maintenance or more generally that there is a need for maintenance on the vehicle. The method 300 is then repeated. In place of or in addition to controlling the display cluster 54 to provide an indication to the driver, it is contemplated that the ECU 200 could control the engine 52 to reduce engine performance, such as by reducing one or more of the maximum engine speed, opening of the throttle body 118, fuel injection and spark timing.

In the present implementation, the threshold belt wear distance is set based on a use of the vehicle 10 operated within the normal wear regions of the operating parameters discussed herein. It is contemplated that in an alternate embodiment, the threshold belt wear distance could be set based on a use of the vehicle at least partially outside the normal wear regions and, in such cases, belt wear effecting factors, such as the belt load factor 212 and the belt temperature factor 216, of between 0 and 1 could be output from their respective maps 204, 208, thereby accounting for use in operating conditions that produce less wear and downwardly adjusting the wear-representative parameter, such as distance travelled by the vehicle 10.

During transmission maintenance, if the drive belt 136 is replaced by a new drive belt 136, the technician making the change uses the display cluster 54, an outside tool communicating with the ECU 200 or some other means of communicating with the ECU 200 to send a signal which indicates to the ECU 200 that a new belt 136 has been installed. Upon receiving this signal, the ECU 200 resets the total belt wear distance 318 to zero meter.

It is contemplated that the total belt wear distance 318 could be adjusted differently than by adding the adjusted belt wear distance 316 to the total belt wear distance. In an alternative embodiment, the total belt wear distance 318 starts at a predetermined value and the adjusted belt wear distance 316 is subtracted from the total belt wear distance 318. The total belt wear distance 320 is then compared to a threshold belt wear distance. If the total belt wear distance 320 is less than or equal to the threshold belt wear distance, the ECU 200 sends a signal to the display cluster 54 to provide an indication that there is a need for transmission maintenance.

It is also contemplated that belt load map 204 and the belt temperature map 208 could have the same shape for providing their respective factors 212, 216, but that all of the values of the factors 212, 216 would be one less than illustrated in FIGS. 8 and 9. As such the factors 212, 216 would have a minimum value of 0.0 instead of 1.0. Therefore, the load and temperature adjusted vehicle speed 312 would provide the variation of vehicle speed resulting from the factors 212, 216 and the vehicle speed obtained at 312 would be added to the vehicle speed 306 before being multiplied by the time interval 314. In an alternative embodiment using these modified maps 204, 208, the variation of vehicle speed obtained at 312 would be carried through up to 320 such that 320 would instead provided a variation in total wear distance (i.e. how much distance the extra wear corresponds to). This variation in total wear distance would then be added to the actual vehicle travel distance that is recorded in parallel. The result of this sum would then be compared to the threshold belt wear distance.

Figure 10:
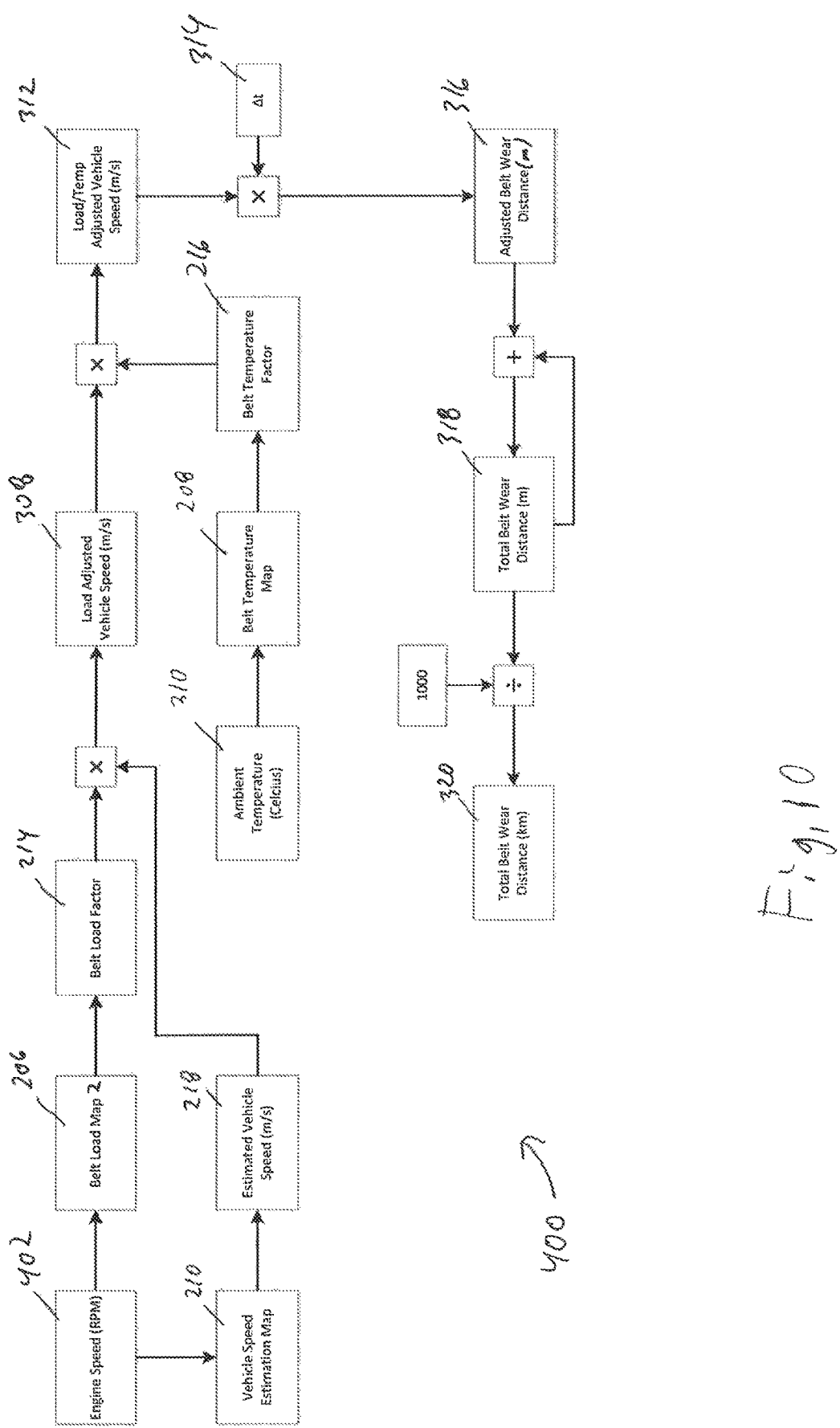
FIG. 10 is a block diagram illustrating an alternative embodiment of the method of FIG. 7.

Turning now to FIG. 10, another method 400 for estimating wear of the drive belt 136 will be described. The method 400 begins by inputting a belt speed-representative parameter into the belt load map 206. In the method 400, the belt speed-representative parameter is engine speed 402. The engine speed 402 is obtained by the ECU 200 from the signal received from the engine speed sensor 222.

Figure 11:
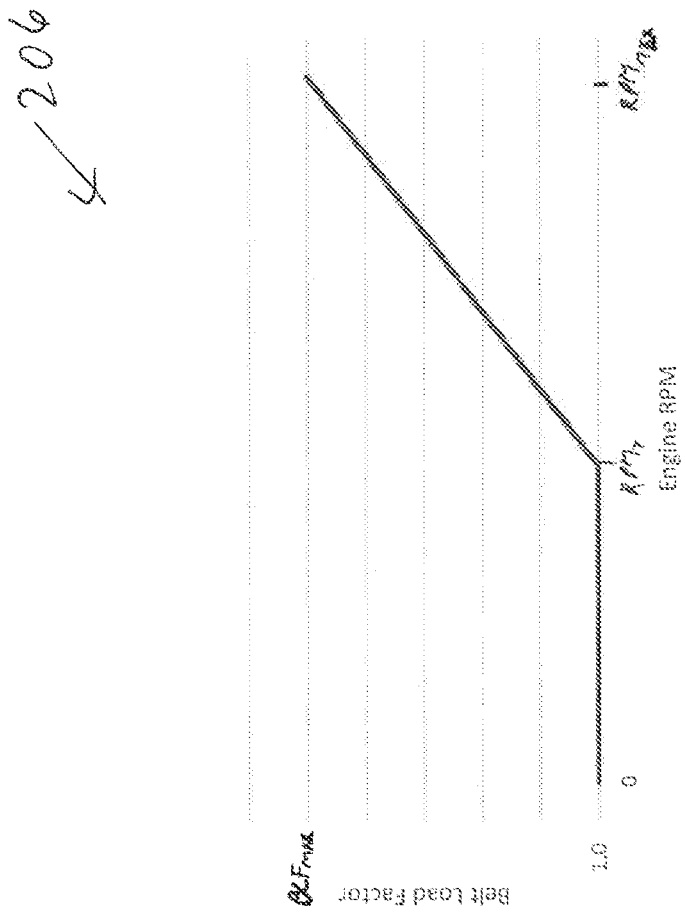
FIG. 11 is a map used for determining a belt load factor in the method of FIG. 10.

As can be seen in FIG. 11, in the belt load map 206, for each value of engine speed 402 the map provides a corresponding belt load factor 214. As can also be seen in FIG. 11, the minimum belt load factor is 1.0, but it is contemplated that it could be less than one if the operation of the vehicle 10 results in less wear of the drive belt 136 than expected. In the belt load map 206 shown in FIG. 11, the belt load factor 214 is 1.0 when the engine speed 402 is less than a transition engine speed $RPM_T$. This flat region is referred to herein as the normal wear region. Also, in the belt load map 206, the belt load factor 214 is greater than 1.0 when the engine speed 402 is greater than the transition engine speed $RPM_T$. This raised region is referred to herein as the extra wear region. The belt load map 206 can be determined experimentally.

Returning to the method 400 in FIG. 10, the ECU 200 obtains the belt load factor 214 from the belt load map 206. Then the ECU 200 multiplies the belt load factor 214 by the estimated vehicle speed 218 to obtain a load adjusted vehicle speed 312 (i.e. the estimated vehicle speed 218 adjusted to take into consideration the belt load factor 214). The estimated vehicle speed 218 is obtained by the ECU 200 from the vehicle speed estimation map 210 into which the engine speed 402 has been provided as an input. It is contemplated that additional inputs could be provided in the vehicle speed estimation map 210 in order to obtain the estimated vehicle speed 218.

The remaining steps of the method 400 are the same as those of the method 300 described above, and as such will not be described again.

In one embodiment, the ECU 200 uses both methods 300 and 400 for estimating wear of the drive belt 136. In this embodiment, the ECU 200 starts by using the method 300. Then, should the relative air charge 302 or the vehicle speed 304 become unavailable or has a faulty value, due to failure of a sensor or to a sensor sending faulty signals, the ECU 200 switches to the method 400 and uses engine speed 402 as a substitute operating parameter to the relative air charge 302 and the vehicle speed 304. When switching to the method 400, the total belt wear distance 318 in the method 400 is assigned the last valid value of the total belt wear distance 318 of the method 300. Should the relative air charge 302 and the vehicle speed 304 become available again or no longer provide faulty values, the ECU 200 would then switch back to the method 300 and the total belt wear distance 318 in the method 300 is assigned the last value of the total belt wear distance 318 of the method 400.

Figure 12:
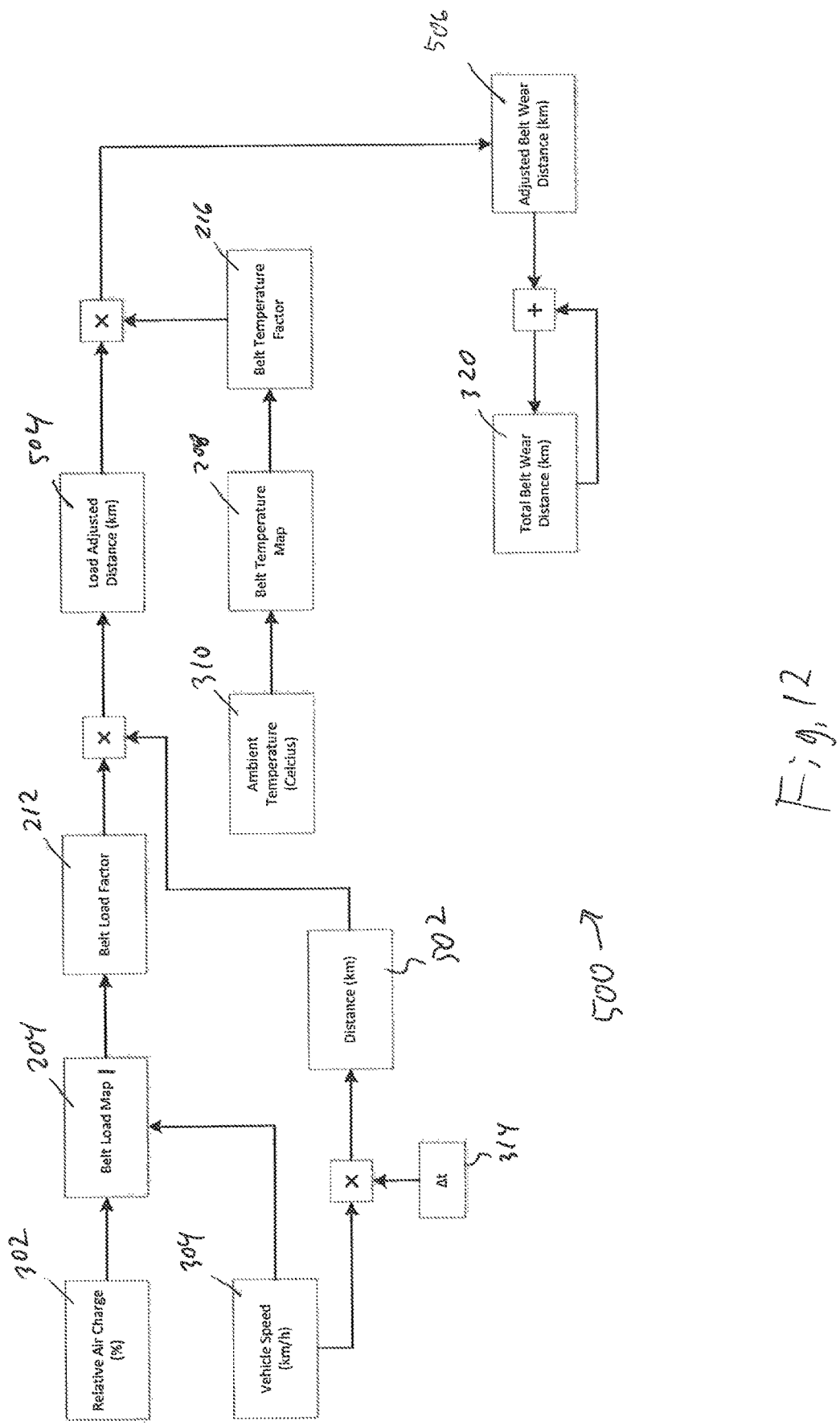
FIGS. 12 to 14 are block diagrams illustrating other alternative embodiments of the method of FIG. 7.

Turning now to FIG. 12, another method 500 for estimating wear of the drive belt 136 will be described. The method 500 begins by determining the belt load factor 212 from the relative air charge 302 and the vehicle speed 304 as in the method 300. The vehicle speed 304 is multiplied by the time interval 314 to obtain a distance 502 (i.e. a belt wear distance). The distance 502 is multiplied by the belt load factor 212 to obtain a load adjusted distance 504. The belt temperature factor 216 is then determined as in the method 300. The load adjusted distance 504 is then multiplied by the belt temperature factor 216 to obtain an adjusted belt wear distance 506. The adjusted belt wear distance 506 is then added to the total belt wear distance 320 to obtain an updated total belt wear distance 320. The updated total belt wear distance 320 is then compared to the threshold belt wear distance as in the method 300 to determine if an indication that transmission maintenance is needed should be provided. The method 500 then repeats.

Figure 13:
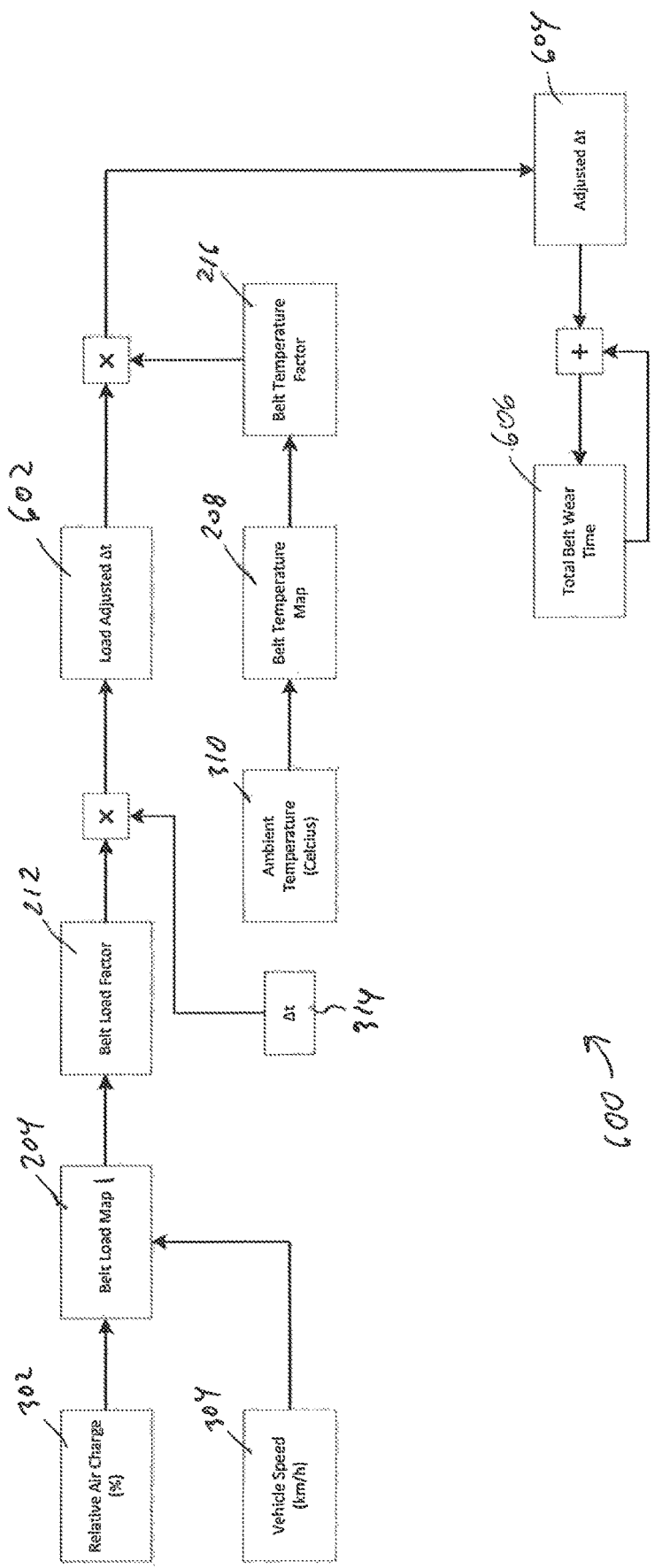

Turning now to FIG. 13, another method 600 for estimating wear of the drive belt 136 will be described. The method 600 is suitable for embodiments where a life span of the drive belt is expressed in terms of drive belt use time. The method 600 begins by determining the belt load factor 212 from the relative air charge 302 and the vehicle speed 304 as in the method 300. The time interval 314, which represent the drive belt used time for this cycle of the method 600, is then multiplied by the belt load factor 212 to obtain a load adjusted time interval 602. The belt temperature factor 216 is then determined as in the method 300. The load adjusted time interval 602 is then multiplied by the belt temperature factor 216 to obtain an adjusted time interval 604. The adjusted time interval 604 is then added to a total belt wear time 606 to obtain an updated total belt wear time 606. The updated total belt wear time 606 is then compared to a threshold belt wear time to determine if an indication that transmission maintenance is needed should be provided. The method 600 then repeats.

It is contemplated that the method 600 could be modified to use a belt-wear representative parameter such as drive belt rotations, engine rotations or drive belt wear units instead of drive belt use time.

Figure 14:
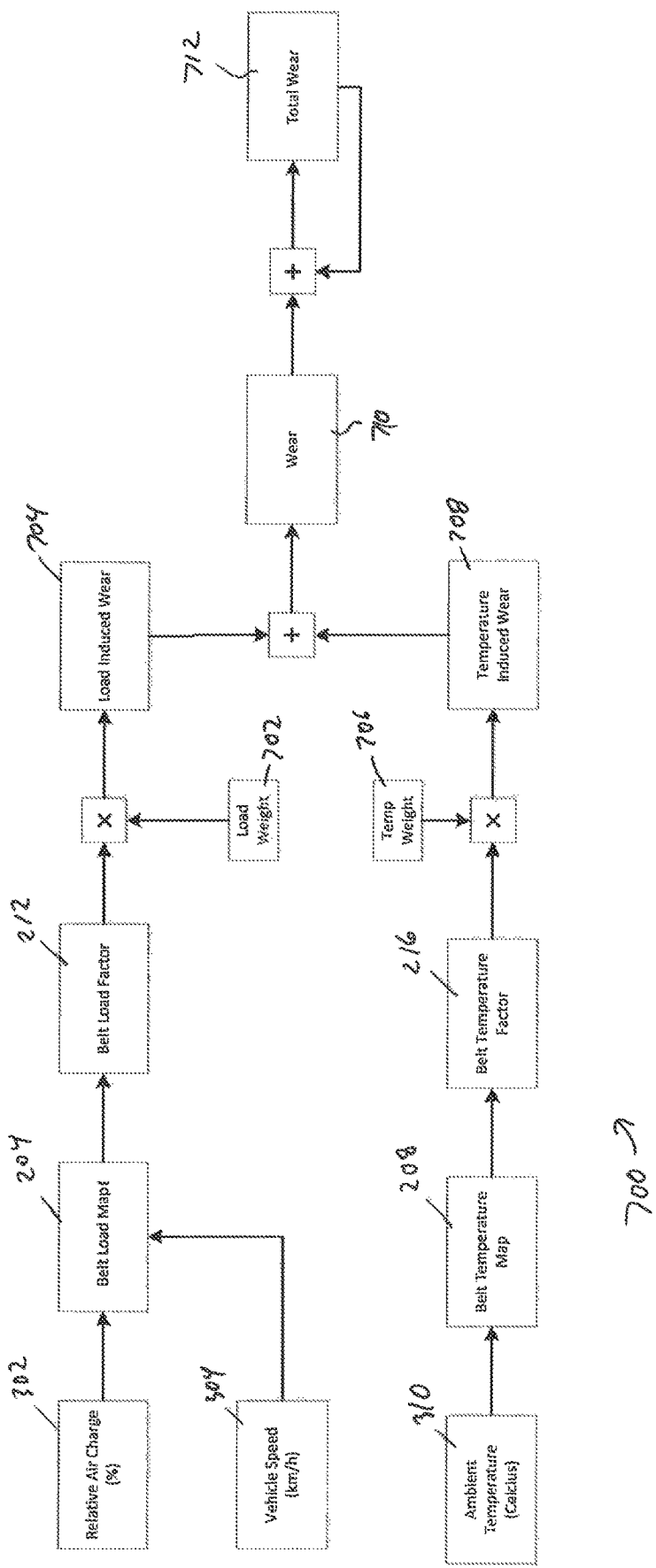

Turning now to FIG. 14, another method 700 for estimating wear of the drive belt 136 will be described. The method 700 begins by determining the belt load factor 212 and the belt temperature factor 216 as in the method 300. The belt load factor 212 is multiplied by a load weight 702 to obtain a load induced wear 704. The load weight 702 is the belt wear-representative parameter to which a weight representative of the importance of the belt load factor 212 has been assigned. As such, the load induced wear 704 is the weighted belt wear-representative parameter adjusted to account for the belt load factor 212. The belt temperature factor 216 is multiplied by a temperature weight 706 to obtain a temperature induced wear 708. The temperature weight 706 is the belt wear-representative parameter to which a weight representative of the importance of the belt temperature factor 216 has been assigned. As such, the temperature induced wear 708 is the weighted belt wear-representative parameter adjusted to account for the belt temperature factor 216. The load induced wear 704 and the temperature induced wear 708 are then added to get an estimated change in belt wear 710. The estimated change in belt wear 710 is representative of the estimated amount of wear of the drive belt 136 for this cycle of the method 700. The estimated change in belt wear 710 is then added to the total estimated belt wear 712 to obtain an updated estimated total belt wear 712. The updated estimated total belt wear 712 is then compared to a threshold belt wear to determine if an indication that transmission maintenance is needed should be provided. The method 700 then repeats.

The method 700 will now be described in an example where the belt wear-representative parameter is drive belt wear units. For purposes of the present example, the normal amount of wear per cycle of the method 700 is 100 drive belt wear units. Also for purposes of the present example, the belt load factor 212 is considered to account for 60 percent of the wear of the drive belt 136 and the belt temperature factor 216 is considered to account for 40 percent of the wear of the drive belt 136. As such, the load weight 702 is 60 drive belt wear units (i.e. 60% of 100 drive belt wear units) and the temperature weight 706 is 40 drive belt wear units (i.e. 40% of 100 drive belt wear units). If the belt load factor 212 is 1.2, the load induced wear 704 is 72 drive belt wear units. If the belt temperature factor 216 is 1.1, the temperature induced wear 708 is 44 drive belt wear units. The estimated change in belt wear 710 for this cycle is then 116 drive belt wear units (i.e. 72 plus 44). As would be understood this is 16% more than the normal amount of wear per cycle of the method 700 of 100 drive belt wear units. The 116 drive belt wear units are then added to the estimated total belt wear 712, and the result is compared to a threshold wear expressed in terms of drive belt wear units which is related to a number of drive belt wear units at which the drive belt 136 should be replaced.

It is contemplated that the above methods 300, 400, 500, 600, 700 could be modified so as to use the same parameters as input, but that the adjusted belt wear-representative parameter could be obtained without using one or both factors 212, 216. In one example, the maps 204, 208 could output an adjusted value of the parameter directly. In another example, one or both maps 204, 208 could be omitted and the inputs that were previously used by the maps 204, 208 could then be used to calculated the adjusted belt wear-representative parameter through other means.

One example of such an alternative embodiment of a method starts by sensing a belt load-representative parameter of the vehicle and a belt temperature-representative parameter of the vehicle. Then, an estimated change in belt wear based on the belt load-representative parameter and the belt temperature-representative parameter is determined. An estimated total belt wear is then adjusted based on the estimated change in belt wear to obtain an updated estimated total belt wear. The updated estimated total belt wear is compared to a threshold belt wear. If the updated estimated total belt wear is greater than or equal to the threshold belt wear, an indication of a need for maintenance on the vehicle is provided. The method is then repeated.

Figure 15:
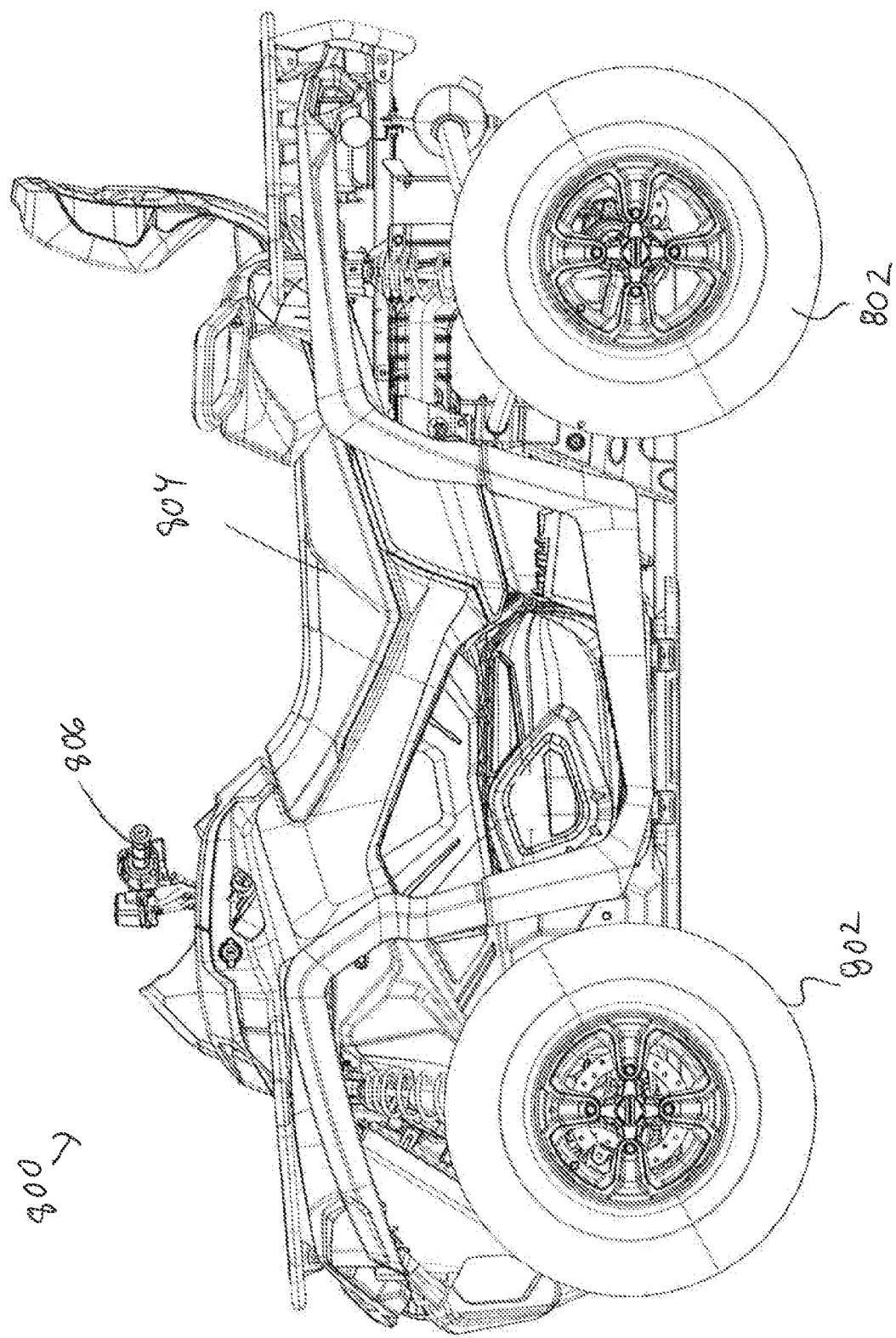
FIG. 15 is a left side elevation view of an all-terrain vehicle (ATV)
Figure 16:
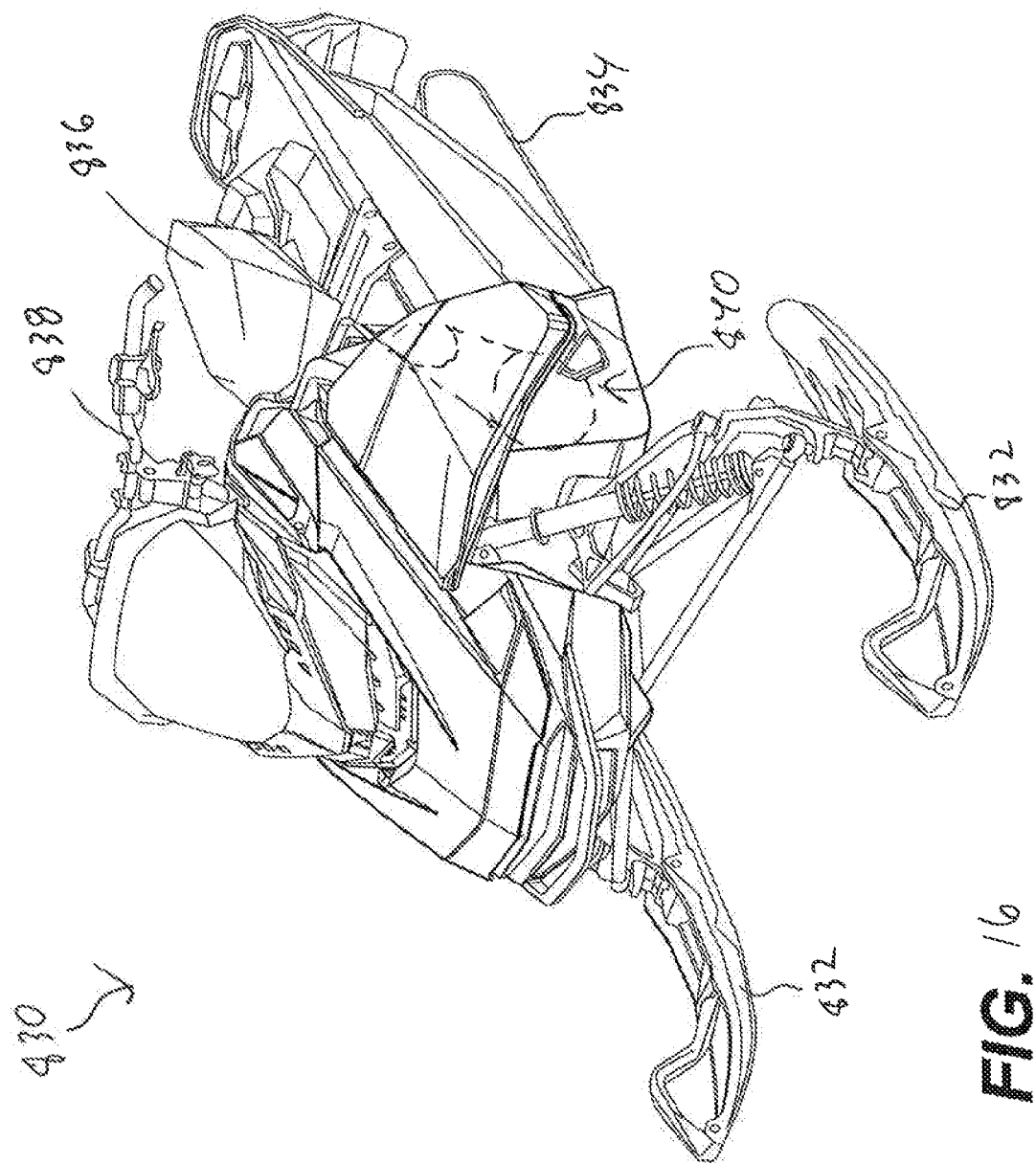
FIG. 16 is a perspective view, taken from a front, left side of a snowmobile.
Figure 17:
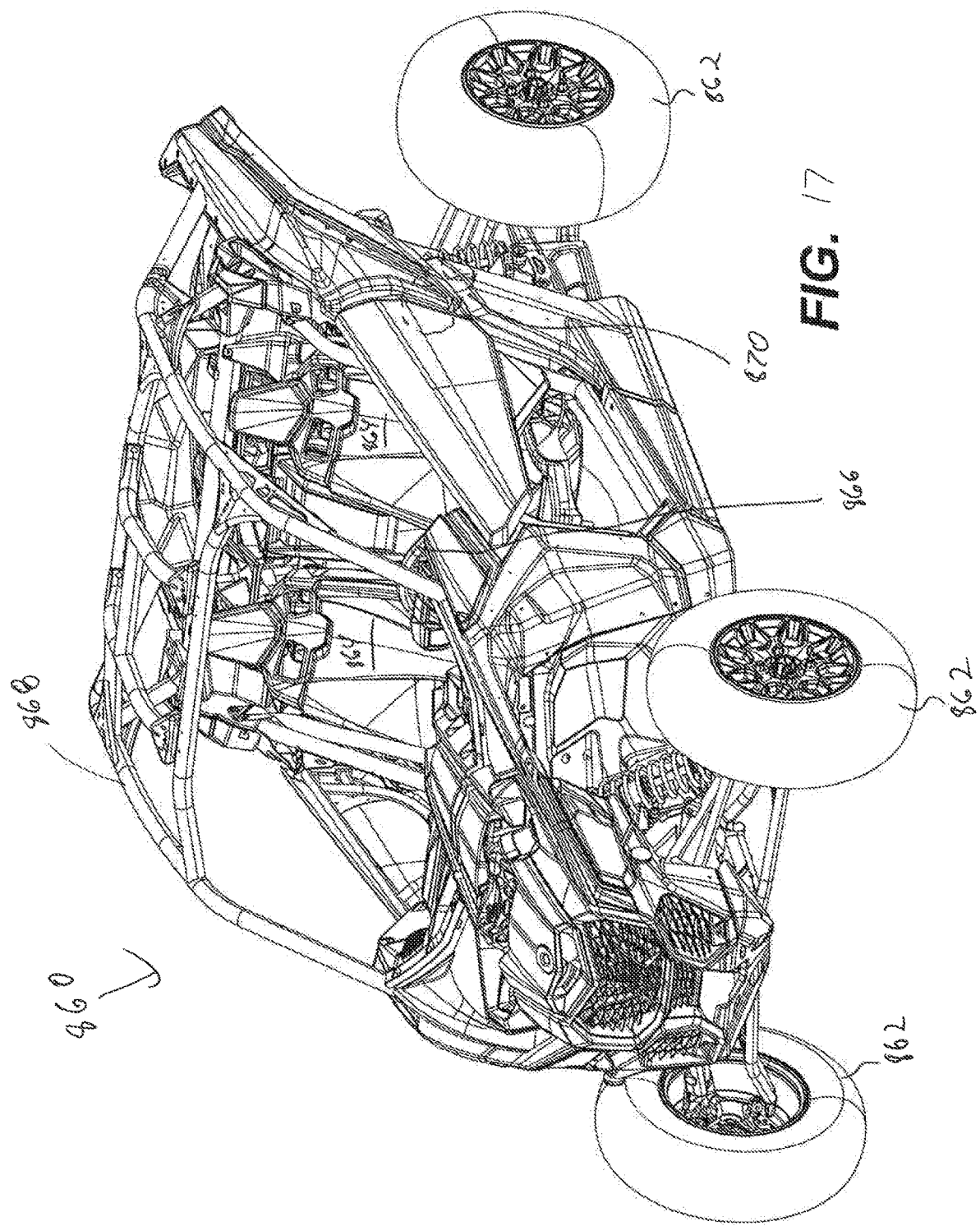
FIG. 17 is a perspective view, taken from a front, left side of an off-road side-by-side vehicle (SSV).

Turning now to FIGS. 15 to 17, examples of other vehicles equipped with a CVT and in which the above methods for estimating wear of the drive belt can be implemented will be described. These vehicles are an all-terrain vehicle (ATV) 800, a snowmobile 830 and an off-road, side-by-side vehicle (SSV) 860.

FIG. 15 shows the ATV 800. The ATV 800 has four wheels 802, a straddle-seat 804 to accommodate a driver and a passenger, and a handlebar 806 for steering the front wheels 802. The engine (not shown) of the ATV 800 is disposed under the seat 804. The engine is coupled to a CVT 808 disposed on the left side of the engine. The CVT 808 is operatively connected to the wheels 802.

FIG. 16 shows the snowmobile 830. In the snowmobile 830, the ground engaging members are two front skis 832 and a rear drive track 834, which differs from the vehicle 10, the ATV 800 and the SSV 860 which have wheels as ground engaging members. The snowmobile also has a straddle-seat 836 to accommodate a driver, and a handlebar 838 for steering the front skis 832. The engine (not shown) of the snowmobile 832 is disposed forwardly of the seat 836 laterally between the skis 832. The engine is coupled to a CVT 840 (schematically shown) disposed on the left side of the engine. The CVT 840 is operatively connected to the drive track 834.

FIG. 17 shows an off-road, side-by-side vehicle (SSV) 860. The SSV 860 has four wheels 862, two bucket seats 864 disposed side-by-side to accommodate a driver and a passenger, a steering wheel 866 for steering the front wheels 862 and a roll cage 868. The engine (not shown) of the SSV 860 is disposed rearward of the seat 864 laterally between the rear wheels 862. The engine is coupled to a CVT 870 disposed on the left side of the engine. The CVT 870 is operatively connected to the wheels 862.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A method for estimating wear of a polymer drive belt of a continuously variable transmission (CVT) provided in a vehicle, the method comprising:
    determining a first belt wear-affecting factor based on at least one first operating parameter of the vehicle;
    determining a second belt wear-affecting factor based on at least one second operating parameter of the vehicle;
    applying the first and second wear-affecting factors to a belt wear-representative parameter to obtain an adjusted belt wear-representative parameter; and
    adjusting a total belt wear-representative parameter based on the adjusted belt wear-representative parameter to obtain an updated total belt wear-representative parameter.

2. The method of claim 1, wherein the at least one first operating parameter includes a belt load-representative parameter.

3. The method of claim 2, wherein the at least one first operating parameter further includes a belt speed-representative parameter.

4. The method of claim 1, wherein the at least one first operating parameter of the vehicle is at least one of:
    vehicle speed;
    engine speed;
    drive belt speed;
    rotational speed of a driven pulley of the CVT;
    rotational speed of a ground engaging member of the vehicle;
    rotational speed of a rotating element operatively connecting the driven pulley to the ground engaging member;
    engine load;
    engine torque;
    CVT ratio;
    air charge; or
    relative air charge.

5. The method of claim 3, wherein:
    the belt speed-representative parameter is one of:
        vehicle speed;
        engine speed;
        drive belt speed;
        rotational speed of a driven pulley of the CVT;
        rotational speed of a ground engaging member of the vehicle; or
        rotational speed of a rotating element operatively connecting the driven pulley to the ground engaging member; and
    the belt load-representative parameter is one of:
        engine load;
        engine torque;
        CVT ratio;
        air charge; or
        relative air charge.

6. The method of claim 3, wherein determining the first belt wear-affecting factor comprises:
    inputting the belt speed-representative parameter and the belt load-representative parameters in one of a first map, a first table or a first equation; and
    obtaining the first belt wear-affecting factor from the one of the first map, the first table or the first equation.

7. The method of claim 1, wherein determining the first belt wear-affecting factor comprises:
    inputting the at least one first operating parameter of the vehicle in one of a first map, a first table or a first equation; and
    obtaining the first belt wear-affecting factor from the one of the first map, the first table or the first equation.

8. The method of claim 1, wherein the first belt wear-affecting factor is a belt load factor associated with a load applied on the drive belt.

9. The method of claim 1, wherein the at least one second operating parameter is a belt temperature-representative parameter.

10. The method of claim 1, wherein the at least one second operating parameter of the vehicle is at least one of:
    ambient air temperature;
    CVT air intake air temperature, the CVT air intake air temperature being a temperature of air in a CVT air intake assembly supplying air in a CVT housing of the CVT;
    CVT housing air temperature, the CVT housing air temperature being a temperature of air in the CVT housing; or
    drive belt temperature.

11. The method of claim 1, wherein determining the second belt wear-affecting factor comprises:
    inputting the at least one second operating parameter of the vehicle in one of a second map, a second table or a second equation; and
    obtaining the second belt wear-affecting factor from the one of the second map, the second table or the second equation.

12. The method of claim 1, wherein the second belt wear-affecting factor is a belt temperature factor associated with a temperature of the drive belt.

13. The method of claim 1, wherein the belt wear-representative parameter is one of:
    vehicle speed;
    vehicle travel distance;
    drive belt use time;
    drive belt rotations;
    engine rotations; or
    drive belt wear units.

14. The method of claim 1, wherein applying the first and second wear-affecting factors to the belt wear-representative parameter to obtain the adjusted belt wear-representative parameter comprises:
    multiplying the belt wear-representative parameter by the first wear-affecting factor and by the second wear-affecting factor to obtain the adjusted belt wear-representative parameter.

15. The method of claim 1, wherein applying the first and second wear-affecting factors to the belt wear-representative parameter to obtain the adjusted belt wear-representative parameter comprises:

multiplying the belt wear-representative parameter by the first wear-affecting factor to obtain a first intermediate adjusted belt wear-representative parameter;

multiplying the belt wear-representative parameter by the second wear-affecting factor to obtain a second intermediate adjusted belt wear-representative parameter; and adding the first and second intermediate adjusted belt wear-representative parameter to obtain the adjusted belt wear-representative parameter.

16. The method of claim 1, wherein adjusting the total belt wear-representative parameter based on the adjusted belt wear-representative parameter to obtain the updated total belt wear-representative parameter comprises:

adding the adjusted belt wear-representative to the total belt wear-representative parameter.

17. The method of claim 1, wherein adjusting the total belt wear-representative parameter based on the adjusted belt wear-representative parameter to obtain the updated total belt wear-representative parameter comprises:

subtracting the adjusted belt wear-representative from the total belt wear-representative parameter.

18. The method of claim 1, further comprising resetting the total belt wear-representative parameter upon receiving a signal indicative that the drive belt has been replaced by another drive belt.

19. A vehicle comprising:
a frame;
a seat connected to the frame;
an engine connected to the frame;
at least one ground engaging member operatively connected to the engine;
a continuously variable transmission (CVT) operatively connecting the engine to the at least one ground engaging member, the CVT comprising:
a drive pulley operatively connected to the engine;
a driven pulley operatively connected to the at least one ground engaging member; and
a drive belt wrapped around the drive pulley and the driven pulley, the drive belt being made of polymer;
a plurality of sensors; and
an electronic control unit (ECU) communicating with the plurality of sensors, the ECU comprising:
a non-transitory computer-readable medium; and
a processor configured to perform the method of claim 1.

20. The vehicle of claim 19, wherein the plurality of sensors include at least two different sensors selected from:
a vehicle speed sensor;
a wheel speed sensor;
an engine speed sensor;
an intake air temperature sensor;
an intake air pressure sensor;
an ambient air temperature sensor;
a belt temperature sensor;
a CVT housing air temperature sensor;
a CVT housing pressure sensor;
an atmospheric pressure sensor; and
a throttle position sensor.

21. A method for estimating wear of a polymer drive belt of a continuously variable transmission (CVT) provided in a vehicle, the method comprising:
sensing a belt load-representative parameter of the vehicle;
sensing a belt temperature-representative parameter of the vehicle;
determining an estimated change in belt wear based on the belt load-representative parameter and the belt temperature-representative parameter;
adjusting an estimated total belt wear based on the estimated change in belt wear to obtain an updated estimated total belt wear;
comparing the updated estimated total belt wear to a threshold belt wear; and
providing an indication of a need for maintenance on the vehicle when the updated estimated total belt wear is greater than or equal to the threshold belt wear.

* * * * *